(12) United States Patent
Takeshima

(10) Patent No.: US 12,481,010 B2
(45) Date of Patent: Nov. 25, 2025

(54) MAGNETIC RESONANCE IMAGING APPARATUS

(71) Applicant: Canon Medical Systems Corporation, Otawara (JP)

(72) Inventor: Hidenori Takeshima, Tokyo (JP)

(73) Assignee: Canon Medical Systems Corporation, Otawara (JP)

( * ) Notice: Subject to any disclaimer, the term of this patent is extended or adjusted under 35 U.S.C. 154(b) by 149 days.

(21) Appl. No.: 18/405,032

(22) Filed: Jan. 5, 2024

(65) Prior Publication Data

US 2024/0230808 A1 Jul. 11, 2024

(30) Foreign Application Priority Data

Jan. 10, 2023 (JP) .................................. 2023-001834
May 18, 2023 (JP) .................................. 2023-082316
Dec. 27, 2023 (JP) .................................. 2023-221437

(51) Int. Cl.
   *G01R 33/54* (2006.01)
   *G01R 33/485* (2006.01)
   *G01R 33/56* (2006.01)

(52) U.S. Cl.
   CPC ......... *G01R 33/543* (2013.01); *G01R 33/485* (2013.01); *G01R 33/5608* (2013.01)

(58) Field of Classification Search
   None
   See application file for complete search history.

(56) References Cited

U.S. PATENT DOCUMENTS

2017/0254869 A1* 9/2017 Miyazaki ......... G01R 33/56509

OTHER PUBLICATIONS

A. D. Harris, et al., "Edited $^1$H Magnetic Resonance Spectroscopy In Vivo: Methods and Metabolites", Magnetic Resonance in Medicine, vol. 77, Issue 4, pp. 1377-1389, 2017.
Extended European Search Report issued Jun. 7, 2024 in European Patent Application No. 24151198.9, 13 pages.
Finkelman et al., "Quantifying the excitatory-inhibitory balance: A comparison of SemiLASER and MEGA-SemiLASER for simultaneously measuring GABA and glutamate at 7T", NeuroImage, vol. 247, Dec. 11, 2021, 13 pages, XP 086929454.
(Continued)

*Primary Examiner* — Farhana A Hoque
(74) *Attorney, Agent, or Firm* — Oblon, McClelland, Maier & Neustadt, L.L.P.

(57) ABSTRACT

The sequence control circuitry repeatedly performs a first data acquisition for acquiring first data, using a first MRS pulse sequence including a first means based on a first pattern that includes frequency selective pulses, and a second data acquisition for acquiring second data, using a second MRS pulse sequence including a second means for selecting a second pattern that differs from the first pattern and includes frequency selective pulses. The frequency selective pulses make selection frequencies of frequency selective pulses before and after an excitation pulse differ and/or are optimized to make ($t_{TE}-t_J$) differ from $t_J$ wherein $t_J$ is a time between the frequency selective pulses and $t_{TE}$ is an echo time.

15 Claims, 11 Drawing Sheets

(56) References Cited

OTHER PUBLICATIONS

Harris et al., "Normalizing data from GABA-edited MEGA-Press implementation at 3 Tesla", Magnetic Resonance Imaging, vol. 42, May 4, 2017, pp. 8-15, XP 093163282.
Gu et al., "GABA Editing with Macromolecule Suppression Using an Improved MEGA-Special Sequence", Magnetic Resonance in Medicine, vol. 79, No. 1, Mar. 31, 2017, pp. 41-47, XP 093163183.
Corsaro et al., "NMR in Metabolomics: From Conventional Statistics to Machine Learning and Neural Network Approaches", Applied Sciences, vol. 12, No. 6, Mar. 1, 2022, 39 pages, XP 093163484.
Galal et al., "Applications of Machine Learning in Metabolomics: Disease Modeling and Classification", Frontiers in Genetics, vol. 13, Nov. 24, 2022, 25 pages, XP 0093130053.

* cited by examiner

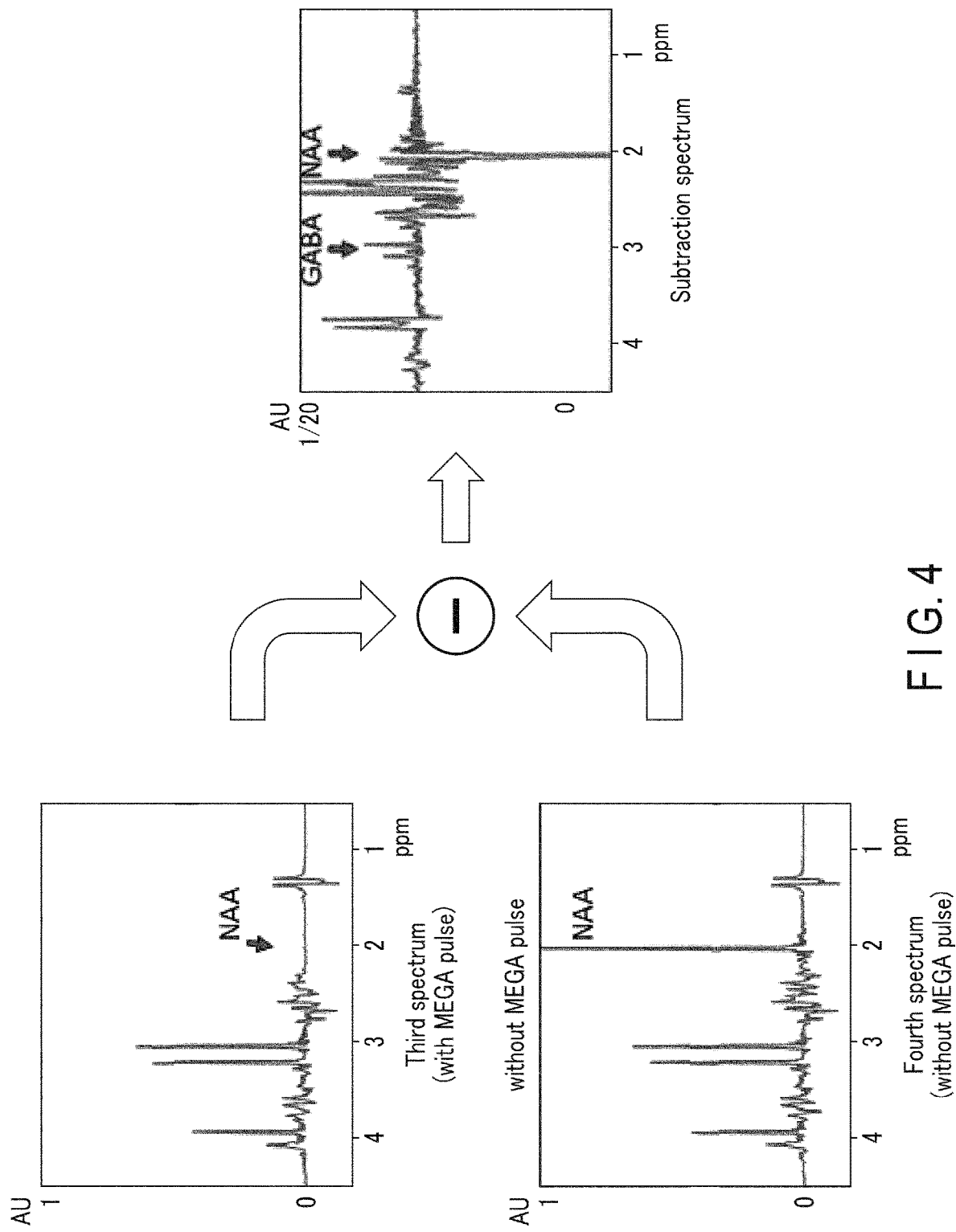
F I G. 4

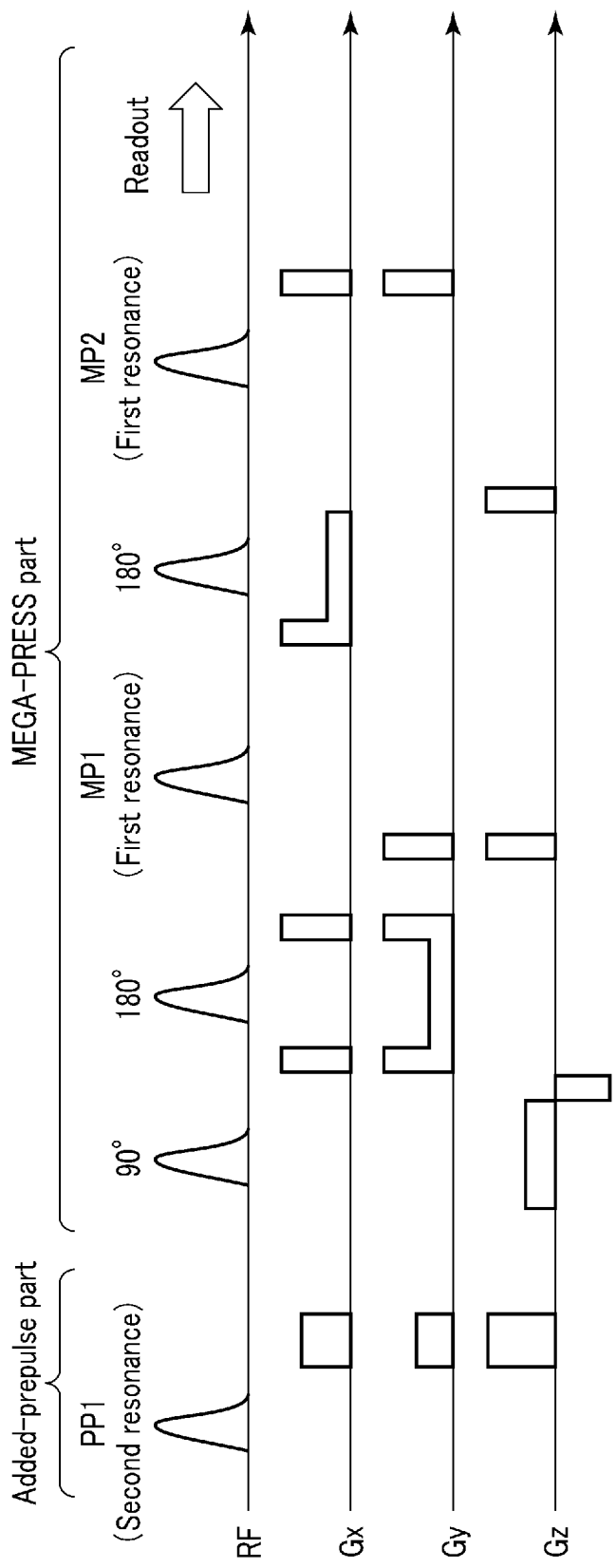
F I G. 6

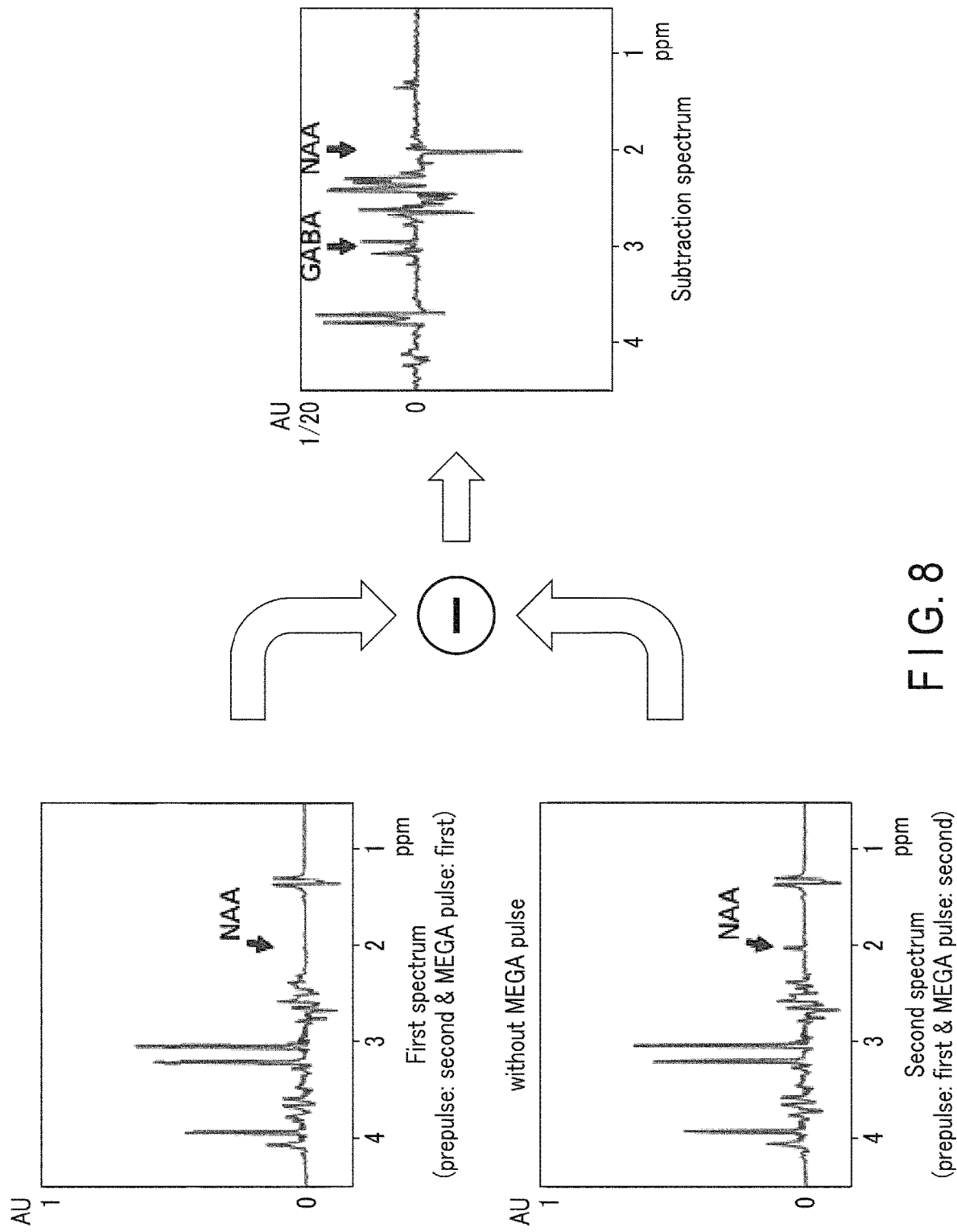
F I G. 8

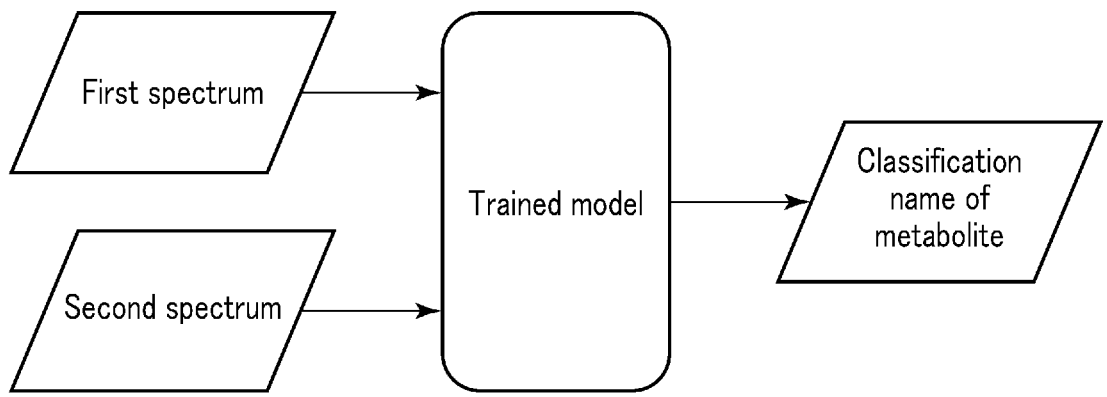
F I G. 9
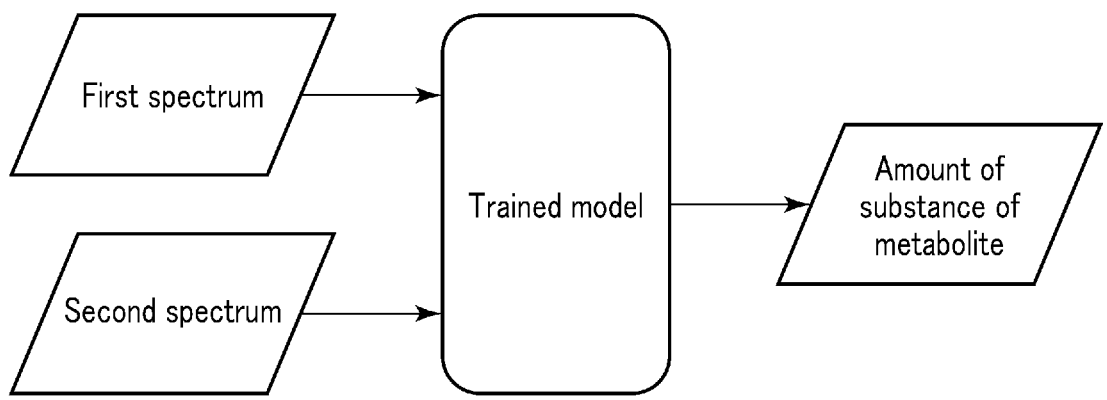
F I G. 10

MAGNETIC RESONANCE IMAGING APPARATUS

CROSS-REFERENCE TO RELATED APPLICATION (S)

This application is based upon and claims the benefit of priority from the Japanese Patent Application No. 2023-001834, filed Jan. 10, 2023, No. 2023-082316, filed May 18, 2023, and No. 2023-221437, filed Dec. 27, 2023, the entire contents of all of which are incorporated herein by reference.

FIELD

Embodiments described herein relate generally to a magnetic resonance imaging apparatus.

BACKGROUND

Magnetic resonance spectroscopy (MRS) provides a technique to analyze types of metabolites in vivo from collected spectrums. Since an RF pulse applied in MRS excites all bandwidths, a weak signal component is buried in a dominant signal component. Editing MRS is known as a technique of breaking down various signal components included in a spectrum. As a pulse sequence used in editing MRS, a MEGA-PRESS method is known.

In a MEGA-PRESS method, one dataset is acquired through PRESS in which a frequency selective pulse called a "MEGA pulse" is applied and the other dataset is acquired through PRESS without an application of a frequency selective pulse, and a difference spectrum is obtained from these datasets, so that a feeble signal component is extracted based on a difference between spectra with and without an application of a frequency selective pulse. However, a signal component of a frequency targeted for suppression through the application of a frequency selective pulse would remain in the difference spectrum. Such a signal component can obstruct spectrum analysis.

BRIEF DESCRIPTION OF THE DRAWINGS

FIG. 4 is a diagram showing an example of a spectrum in MEGA-PRESS with an application of a MEGA pulse, a spectrum without an application of MEGA pulse, and a difference spectrum therebetween.

FIG. 6 is a diagram showing an example of a first MRS pulse sequence of prepulse-added MEGA-PRESS (a prepulse is a second resonance and a MEGA pulse is a first resonance).

FIG. 8 is a diagram showing an example of a first spectrum, a second spectrum, and a difference spectrum in prepulse-added MEGA-PRESS.

FIG. 9 is a diagram showing an example of a process of estimating types of metabolites.

FIG. 10 is a diagram showing an example of a process of estimating an amount of substance of a metabolite.

DETAILED DESCRIPTION

In general, according to one embodiment, a magnetic resonance imaging apparatus includes a sequence control circuitry. The sequence control circuitry repeatedly performs a first data acquisition for acquiring first data relating to a measurement target, using a first MRS pulse sequence including a first frequency selection means based on a first frequency selection pattern that includes a plurality of frequency selective pulses, and a second data acquisition for acquiring second data relating to the measurement target, using a second MRS pulse sequence including a second frequency selection means for selecting a second frequency selection pattern that differs from the first frequency selection pattern and includes a plurality of frequency selective pulses. Wherein the plurality of frequency selective pulses make selection frequencies of frequency selective pulses before and after an excitation pulse differ and/or are optimized so as to make $(t_{TE}-t_J)$ differ from $t_J$ wherein $t_J$ is a time between the plurality of frequency selective pulses and $t_{TE}$ is an echo time.

A magnetic resonance imaging apparatus according to the present embodiment will be described with reference to the accompanying drawings.

Figure 1:
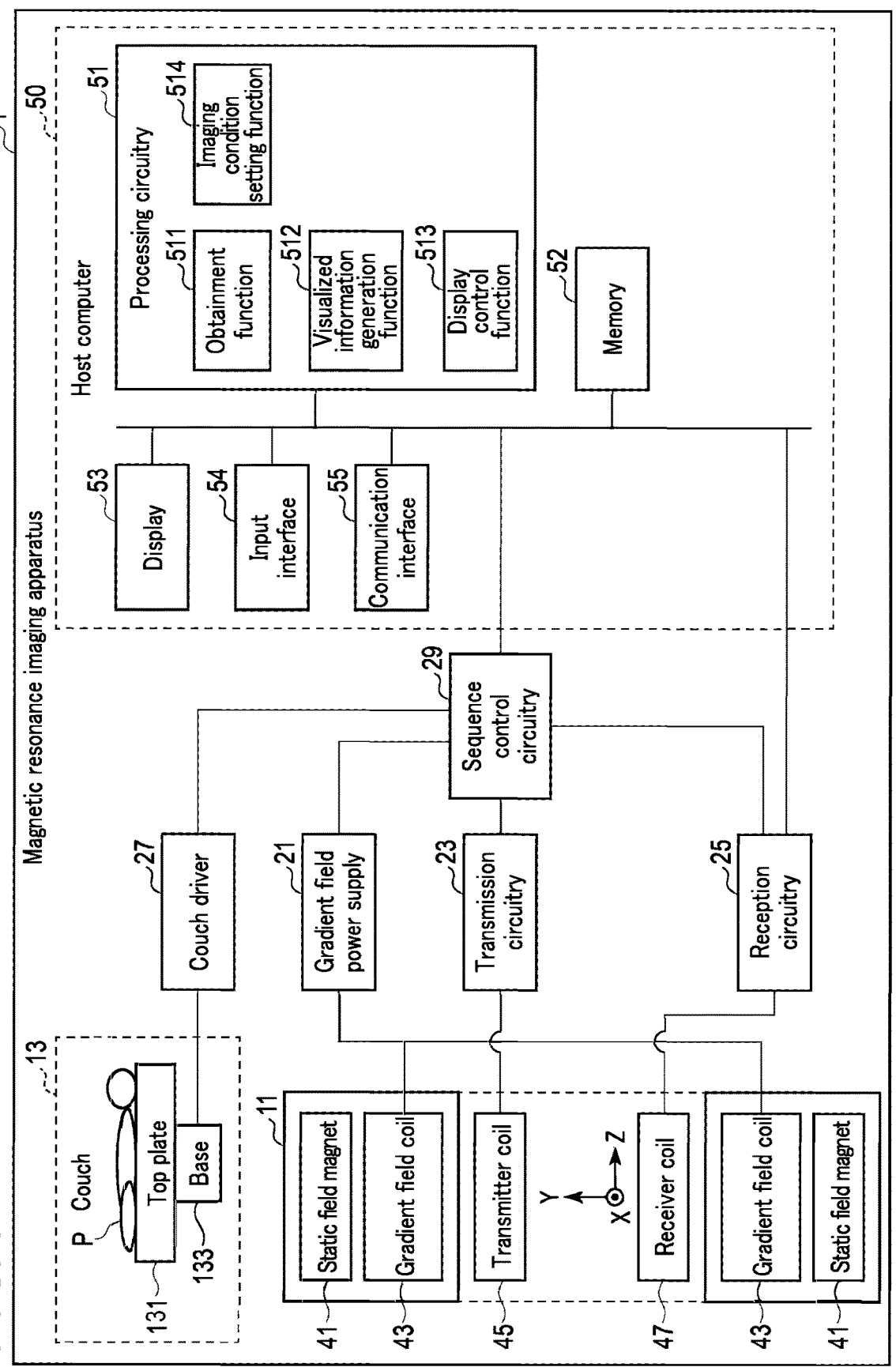
FIG. 1 is a diagram showing a configuration example of a magnetic resonance imaging apparatus according to an embodiment.

FIG. 1 is a diagram of a configuration example of a magnetic resonance imaging apparatus 1 according to the present embodiment. As shown in FIG. 1, the magnetic resonance imaging apparatus 1 includes a gantry 11, a couch 13, a gradient field power supply 21, transmission circuitry 23, reception circuitry 25, a couch driver 27, sequence control circuitry 29, and a host computer 50.

The gantry 11 includes a static magnetic field magnet 41 and a gradient field coil 43. The static field magnet 41 and the gradient field coil 43 are accommodated in the housing of the gantry 11. A bore with a hollow shape is formed in the housing of the gantry 11. A transmitter coil 45 and a receiver coil 47 are disposed in the bore of the gantry 11.

The static magnetic field magnet 41 has a hollow approximately cylindrical shape and generates a static magnetic field inside the approximate cylinder. The static magnetic field magnet 41 uses, for example, a permanent magnet, a superconducting magnet, a normal conducting magnet, etc. The central axis of the static magnetic field magnet 41 is defined as a Z axis; an axis vertically perpendicular to the Z axis is defined as a Y axis; and an axis horizontally perpendicular to the Z axis is defined as an X axis. The X-axis, the Y-axis and the Z-axis constitute an orthogonal three-dimensional coordinate system.

The gradient field coil 43 is a coil unit attached to the inside of the static magnetic field magnet 41 and formed in a hollow, approximately cylindrical shape. The gradient field coil 43 generates a gradient field upon receiving a current supplied from the gradient field power supply 21. Specifically, the gradient field coil 43 includes three coils corresponding respectively to the X, Y, and Z axes which are perpendicular to each other. The three coils generate gradient magnetic fields in which the magnetic field magnitude changes along the X, Y, and Z axes. The gradient magnetic fields along the X, Y, and Z axes are combined to generate a slice selective gradient field Gs, a phase encoding gradient field Gp, and a frequency encoding gradient field Gr, which are perpendicular to each other, in desired directions. The slice selective gradient magnetic field Gs is used to discretionarily determine an imaging slice. The phase encoding gradient magnetic field Gp is used to change a phase of magnetic resonance signals (hereinafter "MR signals") in accordance with a spatial position. The frequency encoding gradient magnetic field Gr is used to change a frequency of an MR signal in accordance with a spatial position. In the following description, it is assumed that the gradient direction of the slice selective gradient magnetic field Gs aligns with the Z axis, the gradient direction of the phase encoding gradient magnetic field Gp aligns with the Y axis, and the gradient direction of the frequency encoding gradient field Gr aligns with the X axis.

The gradient field power supply 21 supplies a current to the gradient field coil 43 in accordance with a sequence control signal from the sequence control circuitry 29. Through the supply of the current to the gradient field coil 43, the gradient field power supply 21 makes the gradient field coil 43 generate gradient magnetic fields along the X-axis, the Y-axis, and the Z-axis. These gradient fields are superimposed on the static magnetic field formed by the static field magnet 41 and applied to the subject P.

The transmitter coil 45 is arranged inside the gradient field coil 43 and generates a high-frequency pulse (hereinafter referred to as an RF pulse) upon receipt of a current supplied from the transmission circuitry 23.

The transmission circuitry 23 supplies a current to the transmitter coil 45 in order to apply an RF pulse for exciting target protons in the subject P to the subject P via the transmitter coil 45. The RF pulse vibrates at a resonance frequency specific to the target protons, and electrically excites those target protons. An MR signal is generated from the electrically excited target protons and is detected by the receiver coil 47. The transmitter coil 45 is, for example, a whole-body coil (WB coil). The whole-body coil may be used as a transmitter/receiver coil.

The receiver coil 47 receives an MR signal generated from the target protons that are present in the subject P as a result of the effects of the RF pulse. The receiver coil 47 includes a plurality of receiver coil elements capable of receiving MR signals. The received MR signal is supplied to the reception circuitry 25 by wiring or wirelessly. Although not shown in FIG. 1, the receiver coil 47 has a plurality of reception channels arranged in parallel. Each receiver channel includes a receiver coil element that receives MR signals, an amplifier that amplifies the MR signals, etc. An MR signal is output from each reception channel. The total number of the reception channels may be equal to, larger than, or smaller than the total number of the receiver coil elements.

The reception circuitry 25 receives an MR signal generated from the excited target protons via the receiver coil 47. The reception circuitry 25 processes the received MR signal to generate a digital MR signal. The digital MR signal can be expressed by a k-space defined by spatial frequency. Hereinafter, the digital MR signals are referred to as k-space data. k-space data is digital data in which a signal strength value of an MR signal is expressed with a time function.

k-space data is supplied to the host computer 50 either by wiring or wirelessly. k-space data is an example of first data and second data.

The transmitter coil 45 and the receiver coil 47 described above are merely examples. A transmitter/receiver coil which has a transmit function and a receive function may be used instead of the transmitter coil 45 and the receiver coil 47. Alternatively, the transmitter coil 45, the receiver coil 47, and the transmitter/receiver coil may be combined.

The couch 13 is installed adjacent to the gantry 11. The couch 13 includes a top plate 131 and a base 133. The subject P is placed on the top plate 131. The base 133 supports the top plate 131 slidably along each of the X-axis, the Y-axis, and the Z-axis. The couch driver 27 is accommodated in the base 133. The couch driver 27 moves the top plate 131 under the control of the sequence control circuitry 29. The couch driver 27 may include, for example, any motor such as a servo motor or a stepping motor.

The sequence control circuitry 29 includes, as hardware resources, a processor such as a central processing unit (CPU) or a micro processing unit (MPU), and a memory such as a read only memory (ROM) or a random access memory (RAM). The sequence control circuitry 29 controls the gradient field power supply 21, the transmission circuitry 23, and the reception circuitry 25 synchronously based on data acquisition conditions that are set by the imaging condition setting function 514 of the processing circuitry 51, and performs data acquisition on the subject P in accordance with the data acquisition conditions to acquire k-space data relating to a subject P. The sequence control circuitry 29 is an example of the acquisition unit.

The sequence control circuitry 29 according to the present embodiment executes data acquisition for MR spectroscopy (MRS), which is a type of chemical shift measurement. The chemical shift measurement is a technique of measuring a chemical shift, which is a minor difference in resonance frequency of a target proton such as a hydrogen nucleus, which is caused in accordance with a difference in chemical environment. MRS includes a single voxel method in which data acquisition is performed on a single voxel and a multi-voxel method in which data acquisition is performed on a plurality of voxels, and the present embodiment can be applied to either method. The multi-voxel method is also referred to as chemical shift imaging (CSI) or MRS imaging (MRSI).

The sequence control circuitry 29 performs data acquisition on a measurement target of a subject P using an MRS pulse sequence. Performing an MRS pulse sequence causes generation of a free induction decay (FID) signal or a spin echo signal from the measurement target of the subject P. The reception circuitry 25 receives an observable MR signal, such as an FID signal or a spin echo signal, via the receiver coil 47, and perform signal processing on the received MR signal to acquire data relating to the measurement target.

The sequence control circuitry 29 repeatedly performs a first data acquisition for acquiring first data relating to a measurement target, using a first MRS pulse sequence including a first frequency selection means based on a first frequency selection pattern that includes a plurality of frequency selective pulses, and a second data acquisition for acquiring second data relating to the measurement target, using a second MRS pulse sequence including a second frequency selection means for selecting a second frequency selection pattern that differs from the first frequency selection pattern and includes a plurality of frequency selection pulses. The frequency selection pattern means a combination of frequency characteristics (a selected frequency of a plurality of frequency selective pulses, an order of selection (order of application) of a plurality of frequency selective pulses, an adjustment of time of application of a plurality of frequency selective pulses) and a design pattern of a sequence. The plurality of frequency selective pulses may make selection frequencies of the frequency selective pulses before and after an excitation pulse differ, and/or may be optimized so as to make $(t_{TE}-t_J)$ differ from $t_J$ wherein $t_J$ is a time between the plurality of frequency selective pulses and $t_{TE}$ is an echo time. Hereinafter, an embodiment is described where selected frequencies of frequency selective pulses before and after an excitation pulse are made different.

The sequence control circuitry 29 repeatedly performs a first data acquisition for acquiring first data relating to a measurement target, using a first MRS pulse sequence targeting a specific frequency targeted for suppression (hereinafter, a "suppression-target frequency"), and a second data acquisition for acquiring second data relating to a measurement target, using a second MRS pulse sequence targeting a suppression-target frequency. The first MRS pulse sequence includes a first frequency selection means for selecting a suppression-target frequency. The second MRS pulse sequence has frequency characteristics differing from those of the first frequency selection means and includes a second frequency selection means for selecting the suppression-target frequency. The suppression-target frequency may be any discretionarily selected frequency, typically a frequency having a relatively strong signal strength that would interfere with data analysis, for example a resonance frequency of a metabolite, such as NAA or GABA. The suppression-target frequency may be set at a bandwidth having a certain width. The frequency selection means refers to one or more RF pulses that achieve an effect of absolutely or relatively suppressing a signal component of the suppression-target frequency, one or more gradient field pulse, or any discretionary combination thereof.

The first frequency selection means includes a first frequency selective pulse of a first resonance and a second frequency selective pulse of a second resonance, as an example. Herein, it is preferable that a frequency band that includes a suppression-target frequency be selected as a first resonance, and a frequency band that does not include a suppression-target frequency be selected as a second resonance. For the sake of explanation, an example with two frequency selective pulses will be described hereinafter; however, three or more frequency selective pulses (e.g., a first resonance, a second resonance, and a third resonance) may be used. The second frequency selection means includes a first frequency selective pulse of a second resonance for a suppression-target frequency and a second frequency selective pulse of a first resonance for a suppression-target frequency. A flip angle of the first frequency selective pulse and that of the second frequency selective pulse may differ from each other. The frequency characteristics of the first frequency selection means is made to differ from those of the second frequency selection means by switching between the first resonance and the second resonance between the first frequency selective pulse and the second frequency selective pulse. Either one of the first resonance or the second resonance may be a frequency selection means in which a rotation angle of a macroscopic magnetization that has resulted from an RF pulse is 0 degrees with respect to all frequency bands.

The first frequency selective pulse and the second frequency selective pulse are used with a basic sequence, and are an RF pulse having a role of editing for enhancing a performance of decomposing a signal at a focused-on frequency that differs from a suppression-target frequency, and the RF pulse has, as an example, a function of absolutely or relatively suppressing signal generation from a suppression target frequency. The first frequency selective pulse is a frequency selective pulse that follows an inverse pulse of a basic sequence of MRS. The second frequency selective pulse is a prepulse that precedes a basic sequence of MRS. The basic sequence means a pulse sequence of MRS to which the first frequency selective pulse and the second frequency selective pulse are not added. A basic sequence is not limited to a particular type; however, PRESS (Point resolved spectroscopy), STEAM (Stimulated echo acquisition mode), LASER (Localization by adiabatic selective refocusing), semi-LASER, SPECIAL (spin echo full intensity acquired localized), ISIS (Image-Selected in vivo spectroscopy), and their advanced techniques may be used. As the first frequency selective pulse, a MEGA (Mescher-Garwood) pulse, a SLOW (SLOtboom-Weng) pulse, a BASING (Band-selective inversion with gradient dephasing) pulse, and an advanced form thereof may be used, for example. As an advanced form of a BASING pulse, a Single-BASING pulse and a Double-BASING pulse are known.

As shown in FIG. 1, the host computer 50 is a computer having processing circuitry 51, a memory 52, a display 53, an input interface 54, and a communication interface 55. Data communications between the processing circuitry 51, the memory 52, the display 53, the input interface 54, and the communication interface 55 are performed via a bus.

The processing circuitry 51 includes a processor such as a CPU, etc. as a hardware resource. The processing circuitry 51 functions as the main unit of the MRI apparatus 1. For example, the processing circuitry 51 executes various programs to implement an obtaining function 511, a visualized information generation function 512, a display control function 513, and an imaging condition setting function 514.

The obtaining function 511 causes the processing circuitry 51 to obtain data acquired by the sequence control circuitry 29, such as first data and second data.

The visualized information generation function 512 causes the processing circuitry 51 to generate visualized information of other frequencies (focused-on frequencies) differing from a suppression-target frequency based on first data and second data acquired by the sequence control circuitry 29. As an example, the processing circuitry 51 generates difference data of the first data and the second data, and generates visualized information based on the generated difference data. As an example, the processing circuitry 51 generates an MRS spectrum and/or a CSI image as visualized information. As another example, the processing circuitry 51 may estimate a classification result of metabolites included in a measurement target and/or a classification result of a disease given from the measurement target based on the first data and the second data, as visualized information. As another example, the processing circuitry 51 may estimate an absolute value and/or a relative value of a metabolite included in a measurement target based on the first data and the second data, as visualized information. The visualized information may or may not include information of a suppression-target frequency.

The display control function 513 causes the processing circuitry 51 to display various types of data, such as visualized information, etc. generated by the visualized information generation function 512 on a display device, such as a display 53.

The imaging condition setting function 514 causes the processing circuitry 51 to set imaging conditions for an MRS pulse sequence of the present embodiment. Examples of the imaging conditions are a type of basic sequence, a type of the first frequency selection means, a type of the second frequency selection means, a repetition time (TR), an echo time (TE), the number of times of integration (number of excitation, NEX) a spectrum width, the number of samplings, and an area selective pulse, etc. The imaging conditions may be set manually by a user or automatically by an algorithm.

The memory 52 is a storage apparatus such as a hard disk drive (HDD), a solid state drive (SSD), an integrated circuitry storage apparatus or the like that stores various information. The memory 52 may be a drive that reads and writes various types of information from and in a portable storage medium such as a CD-ROM drive, a DVD drive, or a flash memory.

The display 53 displays various types of information in accordance with a control by the display control function 513. Examples of appropriate displays 53 that can be used include a CRT display, a liquid crystal display, an organic EL display, an LED display, a plasma display, or any other display known in the art.

The input interface 54 includes an input apparatus that receives various commands from the user. Examples of the input apparatus that can be used include a keyboard, a mouse, various switches, a touch screen, a touch pad, and the like. The input device is not limited to a device with a physical operation component, such as a mouse or a keyboard. For example, examples of the input interface 54 also include electrical signal processing circuitry that receives an electrical signal corresponding to an input operation from an external input apparatus provided separately from the magnetic resonance imaging apparatus 1, and outputs the received electrical signal to various types of circuitry. The input interface 54 may be a speech recognition device that converts audio signals collected by a microphone into command signals.

The communication interface 55 is an interface connecting the magnetic resonance imaging apparatus 1 with a workstation, a picture archiving and communication system (PACS), a hospital information system (HIS), a radiology information system (RIS), and the like via a local area network (LAN) or the like. The communication interface 55 transmits and receives various types of information to and from the connected workstation, PACS, HIS, and RIS.

Next, an example of the operation of the magnetic resonance imaging apparatus 1 according to the present embodiment will be explained.

First, as basic knowledge necessary to understand the present embodiment, the MEGA-PRESS technique in which a MEGA pulse serving as a frequency selective pulse is added to PRESS serving as a basic sequence is explained as an example of an MRS pulse sequence using a single type of frequency selective pulse. MEGA-PRESS is a signal decomposition technique in which datasets are acquired through PRESS with and without an application of a MEGA pulse to obtain a difference spectrum of these data sets and a difference signal component resulting from a difference in magnetic environment between these data sets is extracted.

Figure 2:
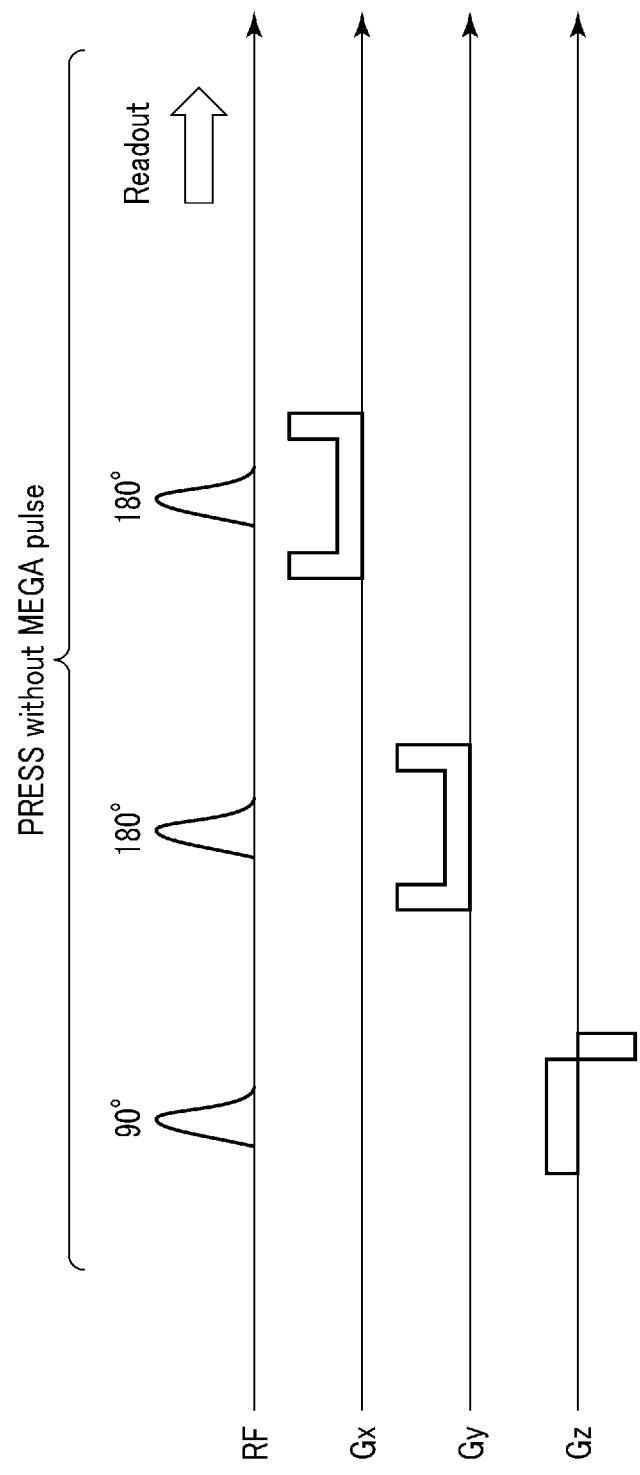
FIG. 2 is a diagram showing an example of a pulse sequence of PRESS without an application of a MEGA pulse.

FIG. 2 is a diagram showing an example of a pulse sequence of PRESS without an application of a MEGA pulse. FIG. 2 shows an example of a pulse sequence corresponding to one repetition time (TR). As shown in FIG. 2, PRESS without an application of a MEGA pulse (or simply "PRESS") generates an MR signal using one 90° excitation pulse and two subsequent 180° inverted pulses. In the description hereinafter, an example where three axes, X-direction, Y-direction, and Z-direction axes, are selected in this order will be discussed; however, the description is applicable to the case where these three axes are rotated in randomly chosen directions. A slice relating to the Z direction is excited by a 90° pulse and a Gz gradient field pulse multiplexed thereon, a slice relating to the Y direction is excited by a first-time 180° pulse and a Gy gradient field pulse multiplexed thereon, and a slice relating to the X direction is excited by a second-time 180° pulse and a Gz gradient field pulse multiplexed thereon. Thus, a voxel of interest that intersects with an orthogonal three slices is selected and an MR signal is generated from the voxel of interest. The generated MR signal is read by a discretionarily selected read gradient field (Readout), and k-space data corresponding to the MR signal is acquired.

Figure 3:
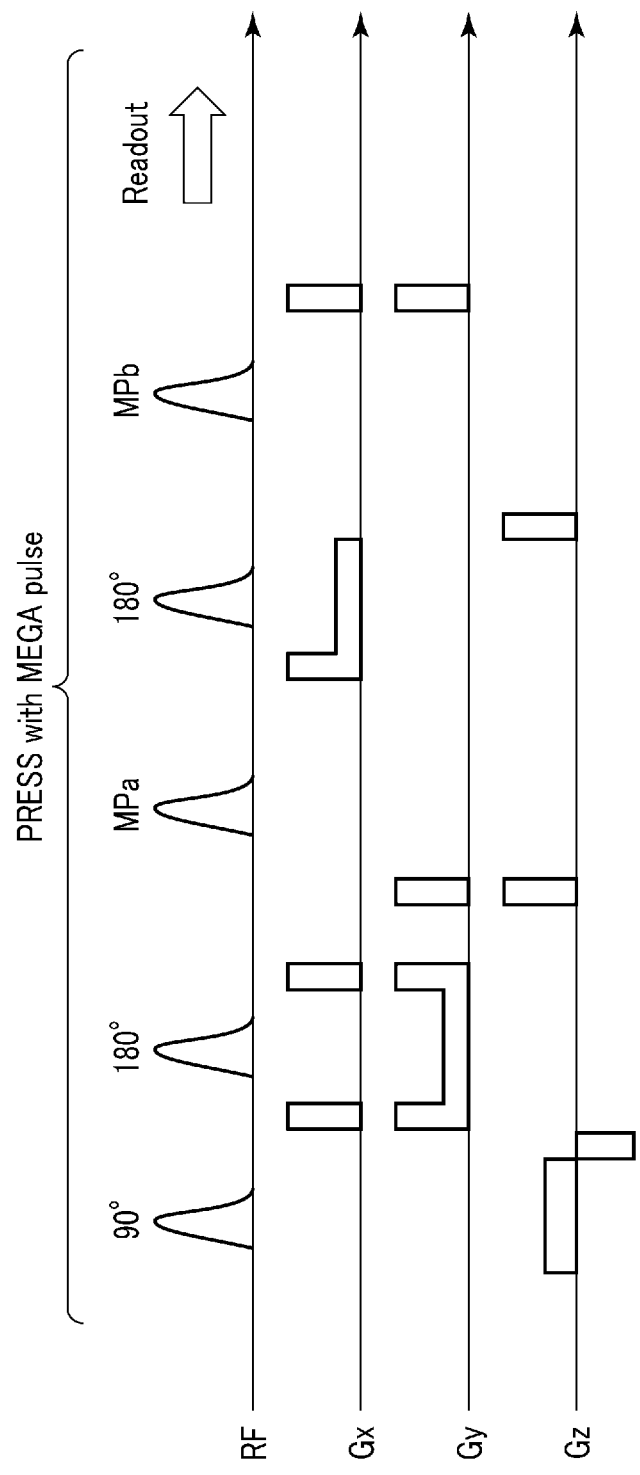
FIG. 3 is a diagram showing an example of a pulse sequence of PRESS without an application of a MEGA pulse.

FIG. 3 is a diagram showing an example of a pulse sequence of PRESS without an application of a MEGA pulse. FIG. 3 shows a pulse sequence corresponding to one repetition time (TR). As shown in FIG. 3, in PRESS with a MEGA pulse, a MEGA pulse MPa and a MEGA pulse MPb, which are a type of frequency selective pulse, are applied between three RF pulse irradiations by the PRESS method. Specifically, a first MEGA pulse MPa is applied between a first 180° inverse pulse and a second 180° inverse pulse, and a second MEGA pulse MPb is applied after a second 180° inverse pulse. As MEGA pulses MPa and MPb, a 180° pulse is used, for example. The waveforms of MEGA pulses MPa and MPb are not limited to a particular shape; however, a Gaussian pulse may be used, for example.

A signal component of the suppression-target frequency is suppressed through an application of MEGA pulses MPa and MPb. Similarly to PRESS without a MEGA pulse, PRESS with a MEGA pulse also generates an MR signal using one 90° excitation pulse and two 180° inverse pulses subsequent thereto. The generated MR signal is read by a discretionarily selected read gradient field (Readout), and k-space data corresponding to the MR signal is acquired. k-space data acquired by PRESS with a MEGA pulse is changed to a signal in which a selective spoiler gradient magnetic field is applied to a signal component corresponding to a suppression-target frequency, in contrast to k-space data acquired by PRESS without a MEGA pulse. In FIG. 4, MEGA pulses MPa and MPb are applied twice; however, the embodiment is not limited to this example, and these pulses may be applied only once or three or more times.

Each of PRESS with a MEGA pulse and PRESS without a MEGA pulse is repeated for the number of times of integration (NEX). The processing circuitry 51 integrates NEX sets of k-space data. Noise can be reduced by integration. The processing circuitry 51 generates a spectrum by performing Fourier Transform on k-space data after each integration operation. In the process of generating a spectrum, various types of correction processing, such as zero-filling processing, phase correction, or a baseline correction, etc., may be performed. A spectrum represents a signal distribution wherein a signal strength is defined on a first axis and a chemical frequency is defined on a second axis orthogonal to the first axis. A spectrum collected by PRESS with a MEGA pulse will hereinafter be called a "third spectrum", and a spectrum collected by PRESS with a MEGA pulse will hereinafter be called a "fourth spectrum".

FIG. 4 is a diagram showing an example of a spectrum (third spectrum) in MEGA-PRESS with an application of a MEGA pulse, a spectrum (fourth spectrum) without an application of a MEGA pulse, and a difference spectrum therebetween. The measurement target of MEGA-PRESS shown in FIG. 4 is a phantom that includes NAA, GABA, and a discretionarily selected substance. The third spectrum is a spectrum collected by PRESS with a MEGA pulse, namely a spectrum collected when a first frequency band (e.g., 1.9 ppm) is applied to a MEGA pulse (hereinafter, this situation will be called "MEGA pulse-ON" in the sense of a first resonance). The fourth spectrum is a spectrum collected by PRESS without a MEGA pulse, namely a spectrum collected when a second frequency band (e.g., 7.5 ppm) is applied to a MEGA pulse (hereinafter, this situation will be called "MEGA pulse-OFF" in the sense of a second resonance). For the frequency selected by a MEGA pulse, assume that a first resonance is set to 1.9 ppm and a second resonance is set to 7.5 ppm; however, a frequency other than this frequency may be used (see Non-Patent Document 1). Assume that the signal collection band of MEGA-PRESS as a whole is, for example, around 1500 to 5000 Hz.

As shown in FIG. 4, in order to decompose a signal, a difference spectrum is obtained by subtracting a fourth spectrum from a third spectrum. As shown in FIG. 4, since the signal component belonging to the suppression-target frequency (1.9 ppm) included in the fourth spectrum is almost all lost in the third spectrum, the signal component, in turn, remains in the difference spectrum. Due to a difference in magnetic environment resulting from a difference between MEGA pulse-ON and MEGA pulse-OFF, the difference spectrum includes a difference signal component in a frequency band other than the suppression-target frequency. As an example, many difference signal components having a relatively strong signal strength manifest in the frequency band of 2.00 or greater. The difference signal components contain a signal component originating from J-coupling that occurs in a partial structure wherein a suppression-target frequency of a measurement target is a resonance frequency.

As shown in FIG. 4, the signal strength of the signal component of the suppression-target frequency is significantly higher than the signal strength of a difference signal component, and this may interfere with the analysis of difference signal component. This is a deficiency of a publicly known signal decomposition method, such as MEGA-PRESS.

Next, a signal decomposition method according to the present embodiment is described. In the present embodiment, two or more frequency selective pulses having different frequency characteristics are used to measure a single readout signal, unlike a publicly known method such as MEGA-PRESS.

Figure 5:
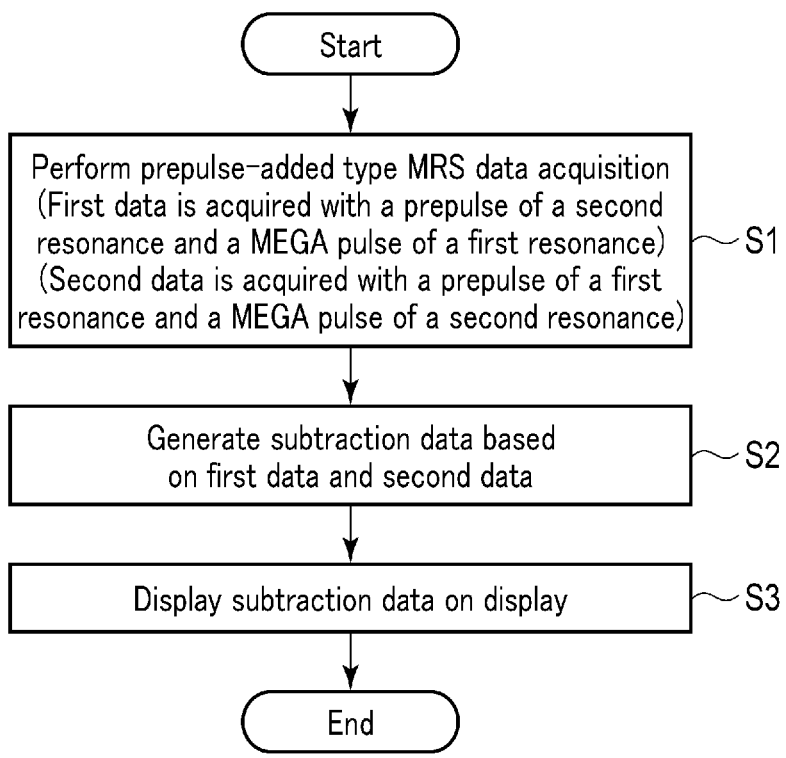
FIG. 5 is a diagram showing an example of a process sequence of MR spectroscopy examination by an MRI apparatus.

FIG. 5 is a diagram showing an example of a process procedure of MR spectroscopy examination performed by the MRI apparatus 1. First, the sequence control circuitry 29 performs prepulse-added type MRS data acquisition (step S1). Prepulse-added type MRS data acquisition is a signal decomposition method in which a prepulse-type frequency selection pulse is added to MEGA-PRESS in order to suppress a signal component belonging to a suppression-target frequency while keeping a difference signal component originating from J-coupling. Hereinafter, the pulse sequence will be called "prepulse-added type MEGA-PRESS".

Prepulse-added type MEGA-PRESS includes, in the case where the suppression-target frequency is expressed as a single RF pulse, pulse sequences including: a first MRS pulse sequence including a prepulse of a second resonance and a MEGA pulse of a first resonance; and a second MRS pulse sequence including a prepulse of a first resonance and a MEGA pulse of a second resonance, for example. Alternatively, for example, in the case where a suppression-target frequency is expressed as two RF pulses, if they are called a first resonance and a second resonance, respectively, and one frequency that is not expressed as an RF pulse is called a third resonance, prepulse-added type MEGA-PRESS includes pulse sequences including: a first MRS pulse sequence including a prepulse of a third resonance and a MEGA pulse of a first resonance; a second MRS pulse sequence including a prepulse of a third resonance and a MEGA pulse of a second resonance; and a third MRS pulse sequence including a prepulse of a first resonance and a MEGA pulse of a third resonance. Alternatively, for example, in the case where a suppression-target frequency is expressed as one RF pulse and two different RF pulses are used as frequencies that are not a suppression target, if the suppression-target frequency is called a first resonance, and the other frequencies are called a second resonance and a third resonance, respectively, prepulse-added type MEGA-PRESS includes pulse sequences including: a first MRS pulse sequence including a prepulse of a second resonance and a MEGA pulse of a first resonance; a second MRS pulse sequence including a prepulse of a third resonance and a MEGA pulse of a second resonance; and a third MRS pulse sequence including a prepulse of a first resonance and a MEGA pulse of a third resonance. MEGA pulse is a frequency selective pulse that follows a 180° inverse pulse included in PRESS. A prepulse is a 90° saturated pulse that precedes PRESS.

FIG. 6 is a diagram showing an example of a first MRS pulse sequence of the prepulse-added type MEGA-PRESS. FIG. 6 shows a pulse sequence corresponding to one repetition time (TR). As shown in FIG. 6, a pulse sequence of the prepulse-added type MEGA-PRESS has a MEGA-PRESS part and an added-prepulse part that precedes the MEGA-PRESS. In the added-prepulse part, a prepulse PP1, which is a 90° pulse, is applied, and a spoiler gradient field pulse is applied. The prepulse PP1 targets a frequency band of a second resonance.

After the added-prepulse part, the MEGA-pulse added PRESS part is performed. In the PRESS part with a MEGA pulse, a MEGA pulse MP1 and a MEGA pulse MP2, which are a type of frequency selective pulse, are applied between three irradiations of an RF pulse (90° excitation pulse, 180° pulse, 180° pulse) by the PRESS method. Specifically, a first MEGA pulse MP1 is applied between a first 180° inverse pulse and a second 180° inverse pulse, and a second MEGA pulse MP2 is applied after a second 180° inverse pulse. MEGA pulse MP1, MP2 is a first resonance targeting a frequency band of a first resonance. As MEGA pulse MP1, MP2, a 180° pulse is used, for example. The waveform of MEGA pulse MP1, MP2 is not limited to a particular shape; however, a Gaussian pulse may be used, for example.

A signal component of the suppression-target frequency is suppressed through an application of MEGA pulse MP1, MP2. An MR signal is generated by applying one 90° excitation pulse and two 180° inverse pulses subsequent thereto. The generated MR signal is read by a discretionarily selected read gradient field (Readout), and k-space data (first k-space data) corresponding to the MR signal is collected. In FIG. 6, MEGA pulse MP1, MP2 is applied twice; however, the embodiment is not limited to this example, MEGA pulse MP1, MP2 may be applied only once or three or more times.

Figure 7:
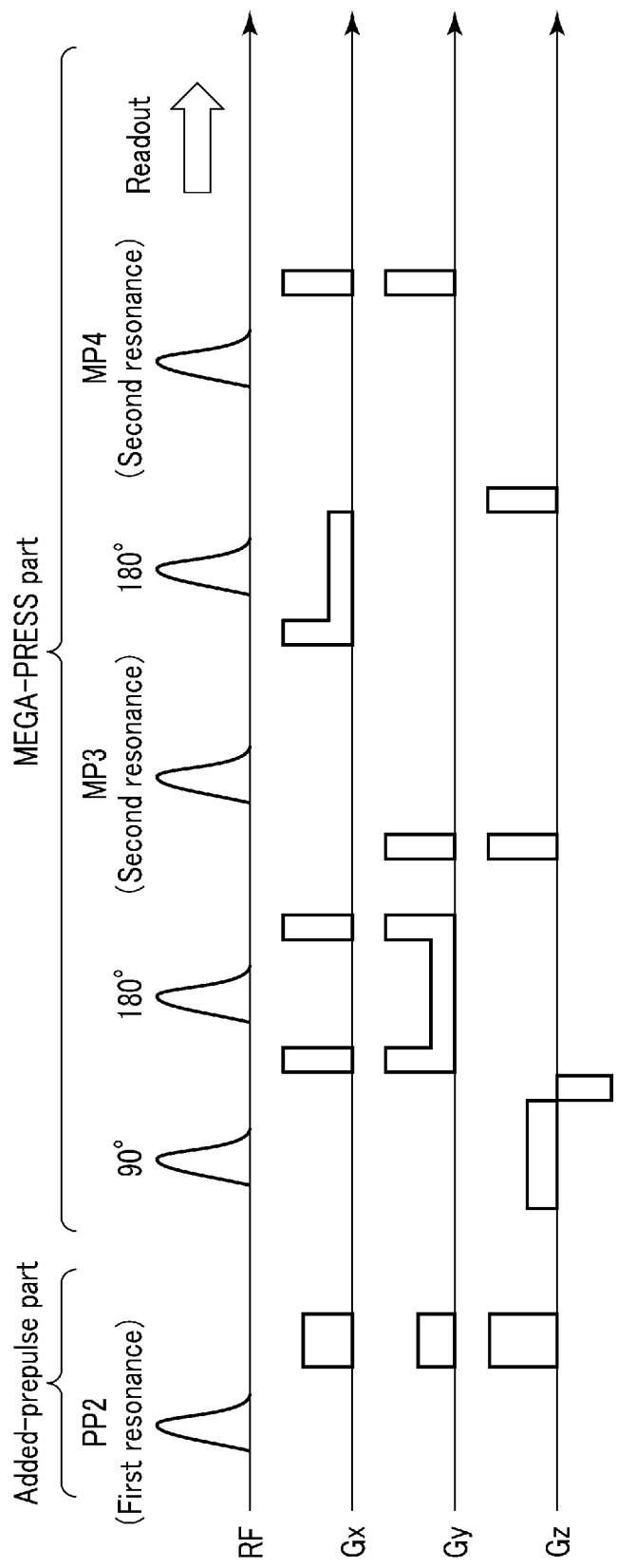
FIG. 7 is a diagram showing an example of a second MRS pulse sequence of prepulse-added MEGA-PRESS (a prepulse is a first resonance and a MEGA pulse is a second resonance).

FIG. 7 is a diagram showing an example of a second MRS pulse sequence of the prepulse-added type MEGA-PRESS. FIG. 7 shows a pulse sequence corresponding to one repetition time (TR). As shown in FIG. 7, the second MRS pulse sequence has an added-prepulse part and a MEGA-PRESS part, similar to the first MRS pulse sequence. In the second MRS pulse sequence, unlike the case of the first MRS pulse sequence, selective frequencies of the prepulse PP2 and MEGA pulse PP3, PP2 are different; in other words, the echo time, the repetition time, and the gradient field pulse are maintained at the same conditions. It is thereby possible to attribute the difference between the second spectrum collected by the second MRS pulse sequence and the first spectrum collected by the first MRS pulse sequence solely to the switching between the first resonance and the second resonance of the prepulse and the MEGA pulse.

The prepulse-added type MEGA-PRESS realizes frequency selection with prepulses PP1 and PP2; however, unlike the polarization transfer shown in "G" of FIG. 1 of Non-Patent Document 1, the prepulse-added type MEGA-PRESS does not include a 90° pulse for making the signal a visible signal. In other words, the prepulse-added type MEGA-PRESS includes a first frequency selective pulse (MEGA pulses MP1 to MP4) and a second frequency selective pulse (prepulses PP1 to PP2), which are two types of RF pulses having different flip angles.

Each of the first MRS pulse sequence and the second MRS pulse sequence is repeated NEX times only. The processing circuitry 51 integrates NEX sets of first k-space data in order to reduce noise. The processing circuitry 51 similarly integrates NEX sets of second k-space data in order to reduce noise. The processing circuitry 51 generates a spectrum by performing Fourier Transform on k-space data after each integration operation. In the process of generating a spectrum, various types of correction processing, such as zero-filling processing, phase correction, or a baseline correction, etc., may be performed. A first spectrum is generated based on the first k-space data, and a second spectrum is generated based on the second k-space data.

After step S1, the processing circuitry 51 generates, through the visualized information generation function 512, difference data based on first data and second data (step S2). Specifically, the processing circuitry 51 generates a difference spectrum of the first spectrum and the second spectrum.

FIG. 8 is a diagram showing an example of a first spectrum, a second spectrum, and a difference spectrum in prepulse-added MEGA-PRESS. A measurement target of the prepulse-additional type MEGA-PRESS shown in FIG. 7 is a phantom including NAA and GABA, similar to FIG. 4. The first spectrum is a spectrum collected by the first MRS pulse sequence, namely a spectrum under a condition that a prepulse is a second resonance and a MEGA pulse is a first resonance. The second spectrum is a spectrum collected by the second MRS pulse sequence, namely a spectrum under a condition whereby a prepulse is a first resonance and a MEGA pulse is a second resonance. Suppose the suppression-target frequency targeted by a prepulse is set at a local frequency band of approximately ±0.3 ppm centered around 1.9 ppm, which is a resonance frequency of NAA. Assume that the signal collection band of prepulse-added MEGA-PRESS as a whole is around 1500 to 5000 Hz.

As shown in FIG. 8, the processing circuitry 51 generates a difference spectrum by subtracting the second spectrum from the first spectrum (hereinafter, a "difference spectrum of the present embodiment"). In the first spectrum, the signal component of the suppression-target frequency is almost completely lost. In contrast to the first spectrum, the signal component of the suppression-target frequency slightly remains in the second spectrum.

As described above, the prepulse-added type MEGA-PRESS includes a first MRS pulse sequence in which a signal component that comes from an atom having a suppression-target frequency at a resonance frequency is not saturated before excitation so as to be removed, and the second MRS pulse sequence in which the signal component is saturated before the excitation so as to be removed. In this method, an additional frequency-selective type saturation part is used in advance of using an excitation part of PRESS. This saturation pulse has a central frequency at an editing frequency (called "active") when a MEGA pulse has a central frequency at a non-editing frequency (called "non-active"). If a saturation pulse is used (i.e., Sat), the pulse sequence operates as MEGA-PRESS where an editing pulse is non-active except that the frequency band of the saturation pulse is not excited. If a MEGA pulse is used (i.e., Nosat), the pulse sequence operates as MEGA-PRESS where an editing part is used. To selectively extract a J-coupling signal, a signal of Nosat is subtracted from a signal of Sat. A spin that is not saturated and progress of J-coupling are active in the case of Sat. In the case of Nosat, total spin and the progress of J-coupling is active, and the progress of J-coupling in the frequency band of a MEGA pulse is spoiled in the MEGA part. Accordingly, in a difference spectrum, which is a difference between a first spectrum collected by a first MRS pulse sequence and a second spectrum collected by a second MRS pulse sequence, it is possible to completely remove a signal component from a metabolite having a property called a "singlet".

A difference spectrum of the present embodiment reflects a magnetic influence caused by switching between a first resonance and a second resonance between two types of frequency selective pulses, a first MRS pulse sequence and a second MRS pulse sequence. As an example, in a difference spectrum of the present embodiment, a signal component of a suppression-target frequency is greatly suppressed, in contrast to a difference spectrum of MEGA-PRESS shown in FIG. 4. A difference signal component originating from J-coupling, etc. of a specific structure having a resonance frequency as a suppression-target frequency clearly manifests in the range between 2.0 ppm and 3.0 ppm of the difference spectrum of the present embodiment. Since a signal component of a suppression-target frequency is thus suppressed in the difference spectrum of the present embodiment, the contrast of the difference signal having a weak signal component is comparatively improved. Therefore, according to the present embodiment, a J-coupling component of an atom having a resonance frequency as a suppression-target frequency can be obtained with a high signal resolution.

After step S2, through the display control function 513, the processing circuitry 51 causes the display 53 to display the difference data generated in step S5 (step S3). Specifically, the processing circuitry 51 causes the display 53 to display the difference spectrum generated in step S2. As described above, since a difference spectrum has a high component decomposability, it is possible to observe a difference signal component, such as J-coupling, etc., using a difference spectrum.

The MRS examination shown in FIG. 2 is thus completed.

Modification 1

In the present embodiment, the visualized information is a spectrum; however, the present embodiment is not limited to this example. As an example, the visualized information may be a chemical shift imaging (CSI) image. A CSI image is an image expressing a spatial distribution of MRS spectrum. As an example, the processing circuitry 51 is capable of generating a CSI image expressing a spatial distribution of a signal strength of an arbitrarily selected chemical shift frequency by collecting spectra by performing MRS data acquisition on each of a plurality of voxels, specifying a signal strength of an arbitrarily selected chemical shift frequency for each voxel, and assigning the signal strength to the voxel.

The processing circuitry 51 according to Modification 1 generates a first CSI image based on k-space data acquired by a first MRS sequence, generates a second CSI image based on k-space data acquired by a second MRS sequence, and generates a difference CSI image based on the first CSI image and the second CSI image. Then, the processing circuitry 51 causes the display 53 to display the difference CSI image.

As an example, the chemical shift frequency visualized by the difference CSI image may be set to a frequency at which a difference signal component remains. In this case, with the difference CSI image, it is possible to observe and analyze a spatial distribution of a partial structure corresponding to J-coupling with a good accuracy.

Modification 2

The visualized information according to the above embodiments is a spectrum or a CSI image. The visualized information in Modification 2 is a classification name of a metabolite or a classification name of a disease. The processing circuitry 51 according to Modification 2 estimates, as visualized information, a classification name of a metabolite included in a measurement target or a classification name of a disease exhibited by the measurement target based on first data and second data. An example of the first data is a first spectrum, and an example of the second data is a second spectrum.

FIG. 9 is a diagram showing an example of a process of estimating a type of metabolite. As shown in FIG. 9, the processing circuitry 51 estimates a classification name of a metabolite included in a measurement target from a first spectrum collected by the first MRS pulse sequence and the second spectrum collected by the second MRS pulse sequence, using a trained model. The classification name is displayed on the display 53 as visualized information.

The trained model is generated by a host computer 50 or another computer. Hereinafter, the computer that trains the trained model will be called a training apparatus. The training apparatus obtains a plurality of training samples each having a combination of first and second spectra and a classification name of a metabolite (correct answer classification name), which is a correct answer label. As a correct answer classification name, it is preferable that a classification name of a metabolite that corresponds to a focused-on frequency differing from the suppression-target frequency in the first spectrum and the second spectrum be given. The training apparatus trains training parameters of a machine learning model based on a plurality of training samples, in accordance with a predetermined optimization algorithm. The machine learning model is designed to have an architecture for multiple-class classification problems, and calculates a classification probability of multiple predetermined metabolites. The training apparatus trains the training parameters so that a classification probability of a metabolite included in a measurement target is estimated from a first spectrum and a second spectrum and a difference between the estimated classification probability and a classification probability corresponding to a correct answer classification name is minimized.

According to Modification 2, since a classification name of a metabolite is estimated based on a first spectrum and a second spectrum, which behave in a different manner for the same measurement target, the accuracy of classification name estimation is expected to improve.

The processing circuitry 51 is also capable of estimating a classification name of a disease exhibited by a measurement target from a first spectrum and a second spectrum, using a trained model with which training parameters are trained in such a manner that a classification name of a disease exhibited by a measurement target is estimated. As a classification name of a disease, it is preferable that a classification name of a disease that a metabolite that corresponds to a focused-on frequency differing from the suppression-target frequency in the first spectrum and the second spectrum involves be given.

An input-output relationship of the trained model according to Modification 2 is not limited to the relationship shown in FIG. 9. As an example, the trained model according to Modification 2 may be a trained model that outputs a classification name of a metabolite or a disease from a difference spectrum of a first spectrum and a second spectrum.

Modification 3

The visualized information in Modification 3 is an amount of substance of a metabolite. The processing circuitry 51 according to Modification 3 estimates, as visualized information, an absolute value and/or a relative value of a metabolite included in a measurement target based on the first data and the second data. An example of the first data is a first spectrum, and an example of the second data is a second spectrum.

FIG. 10 is a diagram showing an example of a process of estimating an amount of substance of a metabolite. As shown in FIG. 10, the processing circuitry 51 estimates an amount of substance of a metabolite included in a measurement target from a first spectrum and a second spectrum, using a trained model. An amount of substance may be defined by a density, a weight, or a volume, etc. An amount of substance is defined by an absolute value and/or a relative value. An amount of substance in MRS is typically defined by a mol density per unit volume, and an absolute value is defined by a ratio of an amount of creatine, which serves as a reference substance, to a density. An amount of substance is displayed on the display 53 as visualized information.

The trained model is generated by a training apparatus, such as a host computer 50 or other computer. The training apparatus obtains a plurality of training samples each having a combination of first and second spectra and an amount of substance of a metabolite (correct answer amount of substance), which is a correct answer label. As a correct answer amount of substance, it is preferable that an amount of substance of a metabolite that corresponds to a focused-on frequency differing from the suppression-target frequency in the first spectrum and the second spectrum be given. The training apparatus trains training parameters of a machine learning model based on a plurality of training samples, in accordance with a predetermined optimization algorithm. The machine learning model is designed to have an architecture for regression problems, and calculates an amount of substance of a predetermined metabolite. The training apparatus trains training parameters so that an amount of substance of a metabolite included in a measurement target from a first spectrum and a second spectrum, and a difference between the estimated amount of substance and a correct answer amount of substance, is minimized.

According to Modification 3, since an amount of substance of a metabolite is estimated based on a first spectrum and a second spectrum behaving differently for the same measurement target, the accuracy of estimating an amount of substance is expected to improve.

An input-output relationship of the trained model according to Modification 3 is not limited to the relationship shown in FIG. 10. As an example, the trained model according to Modification 3 may be a trained model that outputs an amount of substance of a metabolite from a difference spectrum of a first spectrum and a second spectrum.

Modification 4

In the foregoing embodiments, a suppression-target frequency is one band. However, the present embodiment is not limited to this example. A suppression-target frequency may be two or more discrete bands.

It is not always necessary to apply a frequency selective pulse for each suppression-target frequency and a single frequency selective pulse of multi bands may be applied to two or more suppression-target frequencies. With this method, it is possible to suppress signal components of two or more suppression-target frequencies.

According to Modification 4, the present embodiment can be applied even to a case where there are two or more bands as a suppression-target frequency, and it is possible to improve signal decomposition performance.

Modification 5

In the MRS data acquisition in the foregoing embodiments, there are two types of data acquisition, a first MRS pulse sequence and a second MRS pulse sequence, which target the suppression-target frequencies for selection. However, the present embodiment is not limited to this example. In addition to the first MRS pulse sequence and the second MRS pulse sequence, data acquisition in which a wide frequency bandwidth is a selection target (hereinafter, wide-frequency data acquisition). Herein, the wide frequency band includes a suppression-target frequency and a frequency band corresponding to a peak of a main component such as water or fat (e.g., a frequency band around 4.8 ppm or 1.3 ppm). The pulse sequence of the data acquisition of a wide frequency band does not include a frequency selective pulse as a first frequency selection means and a prepulse as a second frequency selection means. Such a pulse sequence is realized by a basic sequence of PRESS, etc., for example.

The sequence control circuitry 29 according to Modification 5 acquires first data through frequency selective pulse-type data acquisition and prepulse-type data acquisition, acquires second data through prepulse-type data acquisition, and acquires third data through wide frequency band data acquisition. The processing circuitry 51 generates a first spectrum based on first data, a second spectrum based on second data, and a spectrum based on third data (hereinafter, a "wide frequency band spectrum"). In the wide frequency band spectrum, a signal component of a suppression-target frequency is not suppressed.

The processing circuitry 51 generates visualized information in which a frequency other than a suppression-target frequency is visualized based on the first spectrum, the second spectrum, and the wide frequency band spectrum. As an example, the processing circuitry 51 generates a second difference spectrum based on the first spectrum and the wide frequency band spectrum, and generates a third difference spectrum based on the second spectrum and the wide frequency band spectrum. It suffices that the second difference spectrum and the third difference spectrum may be displayed on the display 53. The processing circuitry 51 may generate a fourth difference spectrum based on the second difference spectrum and the third difference spectrum. The fourth difference spectrum is displayed on the display 53.

The processing circuitry 51 may estimate a classification name of a metabolite included in a measurement target and/or a classification name of a disease exhibited by the measurement target based on the second difference spectrum and the third difference spectrum, similarly to Modification 2. The processing circuitry 51 may specify an amount of substance of a metabolite included in a measurement target based on the second difference spectrum and the third difference spectrum, similarly to Modification 3.

According to Modification 5, signal decomposition can be conducted using three or more types of MRS data acquisition.

SUMMARY

A magnetic resonance imaging apparatus according to the present embodiment includes sequence control circuitry 29. The sequence control circuitry 29 repeatedly performs first data acquisition for acquiring first data relating to a measurement target, using a first MRS pulse sequence for a specific frequency which is targeted for suppression (suppression-target frequency), and a second data acquisition for acquiring second data relating to a measurement target, using a second MRS pulse sequence for the suppression target frequency. The first MRS pulse sequence includes a first frequency selection means for selecting a suppression-target frequency. The second MRS pulse sequence has frequency characteristics differing from those of the first frequency selection means and includes a second frequency selection means for selecting a suppression-target frequency.

According to the above-described structure, it is possible to suppress a suppression-target frequency through both the first data acquisition and the second data acquisition and to intentionally differentiate the frequency suppression mode for a frequency other than the suppression-target frequency. It is thereby possible to acquire first data and second data having different frequency suppression modes for a frequency other than the suppression-target frequency. Furthermore, the acquisition of first data and second data allows the above-described structure to greatly suppress a signal component of a suppression-target frequency and to generate a visualized signal in which a weak signal component of a frequency other than a suppression-target frequency is reinforced relatively to other frequencies. Thus, accuracy of analysis of a weak signal component is expected to improve.

OTHER EMBODIMENTS

Figure 11:
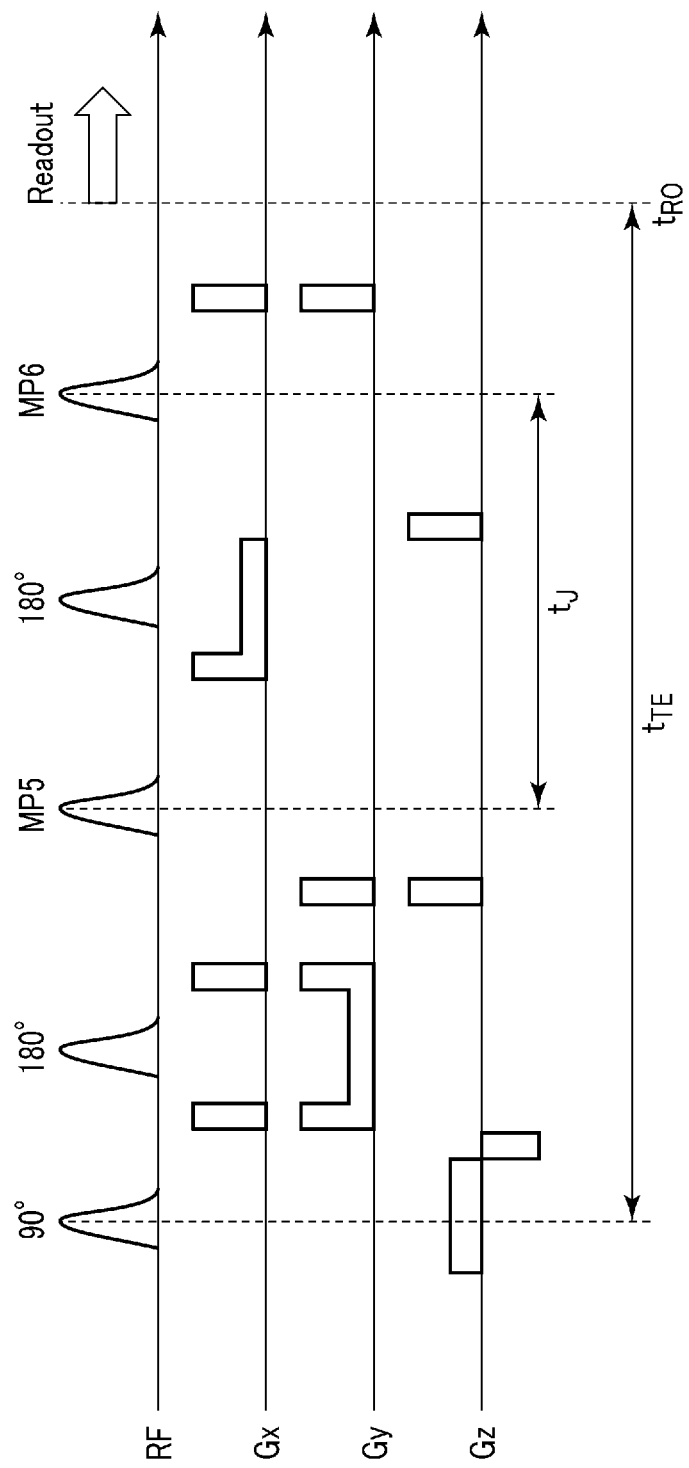
FIG. 11 is a diagram illustrating some time parameters according to an MRS pulse sequence of the present embodiment.

First, some time parameters used in an MRS pulse sequence are described. FIG. 11 is a diagram illustrating some time parameters according to an MRS pulse sequence of the present embodiment. FIG. 11 shows a PRESS pulse sequence with a MEGA pulse as an example of an MRS pulse sequence, similarly to FIG. 3. As shown in FIG. 11, and as shown in FIG. 3, in PRESS with a MEGA pulse, a MEGA pulse MP5 and a MEGA pulse MP6, which are a type of frequency selective pulse, are applied between three RF pulse irradiations by the PRESS method. Specifically, a first MEGA pulse MPa is applied between a first 180° inverse pulse and a second 180° inverse pulse, and a second MEGA pulse MPb is applied after a second 180° inverse pulse. The echo time $t_{TE}$ indicates a time elapsed between a time of applying an excitation pulse (if a pulse having a certain length of time is applied at a specific instance, the time indicates the specific instant) and a time $t_{RO}$ of MR signal collection (Readout). Time $t_J$ is a time elapsed between a time of applying MEGA pulse MP5 and a time of applying MEGA pulse MP6 as an example of frequency selective pulse. As described in the following, MEGA pulse MP5 and MEGA pulse MP6 may be optimized for the time $t_J$ and the echo time $t_{TE}$ along with or without an application of an additional prepulse, so that $(t_{TE}-t_J)$ differs from $t_J$.

Next, a logical background of an MRS pulse sequence using a MEGA pulse is described. Collective behavior of a single type of target molecule is explained using a product operator formalism (POF). POF is a common formulation method in this field, and the explanation of this method can be found in lecture materials used at an NMR-related course held at Stanford University (https://web.stanford.edu/class/rad226a/), for example.

Suppose that a target molecule is constituted by two or more spins. An excitation pulse or a re-convergence pulse acts on all spins, and a MEGA pulse acts on a subset of all spins.

Hereinafter, a randomly chosen spin of all spins is focused-on, and this spin is referred to as a "focused-on spin". The other spins are referred to as "non-focused-on spins". The operator of the focused-on spin corresponding to the x, y, and z directions is expressed as Ix, Iy, Iz. The k-th non-focused-on spin (1, 2, . . . , k) is expressed as $S_{k,x}$, $S_{k,y}$, $S_{k,z}$. The spin density operator in a balanced state is $Iz+\Sigma k$ $(S_{k,z})$. For convenience of analysis, suppose a time taken by all pulses can be ignored, an excitation pulse is considered only for the Hamiltonian of π/2-times x-direction spin, a re-convergence spin is considered only for the Hamiltonian of a n-times y-direction spin, and MEGA pulse is considered only for the Hamiltonian of a n times, y-direction spin with respect to a spin selected by frequency selection, and the terms other than the z-direction spin in the spin-spin coupling can be ignored.

As long as understanding of the behavior of the focused-on spin is sufficient in order to understand a pulse sequence, only Iz is considered as a partial spin density operator. The Hamiltonian of the excitation pulse is given by $(-\pi/2)(Ix+\Sigma k_{(k,x)})$; therefore, the partial spin density operator immediately after excitation is Iy. It should be noted that only free precession and a π-times Hamiltonian are observed after excitation.

For the sake of explanation, the operator R is defined as in Expression (1).

$$R(\theta, \phi_1, \ldots, \phi_k) = \tag{1}$$
$$\exp(-iH_R(\theta, \phi_1, \ldots, \phi_k)) I_y \exp(iH_R(\theta, \phi_1, \ldots, \phi_k))$$
$$H_R(\theta, \phi_1, \ldots, \phi_k) = -\theta I_z + 2\sum_k \phi_k I_z S_{k,z}$$

From the definition, an initial state Iy immediately after excitation is given by $R(0, 0, \ldots, 0)$. If the Hamiltonian of free precession is given by Expression (2), a partial spin density operator to which free precession of time t is applied to partial spin density operator $R(\theta, \phi_1, 0 \ldots, \phi_k)$ can be expressed by Expression (3).

$$H_{free} = -\omega I_z - \sum_k \omega_k S_{k,z} + 2\sum_k \pi J_k I_z S_{k,z} \tag{2}$$

$$R(\theta + \omega t, \phi_1 + \pi J_1 t, \ldots, \phi_k + \pi J_1 t) \tag{3}$$

The partial spin density operator after applying a re-convergence pulse to the partial spin density operator $R(\theta, \phi_1, \ldots, \phi_k)$ can be expressed as Expression (4):

$$R(-\theta, \phi_1, \ldots, \phi_k) \tag{4}$$

As for a MEGA pulse, since an observable signal disappears due to a crusher in a case where a MEGA pulse acts on a focused-on spin, a case where a MEGA pulse does not act on a focused-on spin is taken as an example herein.

If a MEGA pulse acts only on $k < k_{MEGA}$ as an inverse pulse, the partial spin density operator after applying a MEGA pulse to a partial spin density operator $R(\theta, \phi_1, \ldots, \phi_k)$ can be expressed as Expression (5):

$$R(\theta, -\phi_1, \ldots, -\phi_{k_{MEGA}}, \ldots, \phi_k) \tag{5}$$

A typical MEGA-PRESS sequence, for example, performs excitation, free precession of time t1, re-convergence, free precession of time t2, a MEGA pulse, free precession of time t3, re-convergence, free precession of time t4, a MEGA pulse, free precession of time t5, and finally readout. Thus, if a calculation of the partial spin density operator starts from an initial state $R(0, 0, \ldots, 0)$ immediately after excitation, the partial spin density operator during read out can be expressed as Expression (6). This partial spin density operator during readout can be expressed as $Q(t_{RO})$.

$$Q(t_{RO}) = R(\omega(t_1 - t_2 - t_3 + t_4 + t_5), \pi J_1(t_1 + t_2 - t_3 - t_4 + t_5), \ldots, \tag{6}$$
$$\pi J_{k_{MEGA}}(t_1 + t_2 - t_3 - t_4 + t_5), \pi J_{k_{MEGA}+1}(t_1 + t_2 + t_3 + t_4 + t_5), \ldots,$$
$$\pi J_K(t_1 + t_2 + t_3 + t_4 + t_5))$$

Herein, the case expressed as $t_1+t_2+t_3+t_4+t_5=t_{TE}+t_{RO}$, and where re-convergence is achieved if $t_{RO}=0$, in other words, $t_1+t_2-t_3-t_4+t_5=t_{RO}$, is assumed. If $t_3+t_4=t_J$, the partial spin density operator is expressed as Expression (7).

$$Q(t_{RO}) = R(\omega t_{RO}, \pi J_1(t_{TE} + t_{RO} - 2t_J), \ldots, \tag{7}$$
$$\pi J_{k_{MEGA}}(t_{TE} + t_{RO} - 2t_J), \pi J_{k_{MEGA}+1}(t_{TE} + t_{RO}), \ldots, \pi J_K(t_{TE} + t_{RO}))$$

The observable signals in the x direction and y direction stemming from an initial spin Iz are proportional to $\text{Tr}\{Q(t_{RO})I_x\}$, $\text{Tr}\{Q(t_{RO})I_y\}$, respectively, by a pulse sequence using a MEGA pulse. Hereinafter, two spins and three spins are explained as an example for the sake of explanation; however, the same characteristics can be derived from the case of four or more spins.

First, the case of two spins, namely K=1, is assumed.

The observed signals $\text{Tr}\{Q(t_{RO})I_x\}$ and $\text{Tr}\{Q(t_{RO})I_y\}$ in the case of $k_{MEGA}=0$ (corresponding to "MEGA OFF") are proportional to the right terms of Expressions (8) and (9), respectively.

$$Tr\{Q(t_{RO})I_x\} \propto -\sin \omega t_{RO} \cos \pi J_1(t_{TE} + t_{RO}) \quad (8)$$

$$Tr\{Q(t_{RO})I_y\} \propto \cos \omega t_{RO} \cos \pi J_1(t_{TE} + t_{RO}) \quad (9)$$

The observed signals $Tr\{Q(t_{RO})I_x\}$ and $Tr\{Q(t_{RO})I_y\}$ in the case where $k_{MEGA}=1$ (corresponding to "MEGA ON") are proportional to the right terms of Expressions (10) and (11), respectively.

$$Tr\{Q(t_{RO})I_x\} \propto -\sin \omega t_{RO} \cos \pi J_1(t_{TE} + t_{RO} - 2t_J) \quad (10)$$

$$Tr\{Q(t_{RO})I_y\} \propto \cos \omega t_{RO} \cos \pi J_1(t_{TE} + t_{RO} - 2t_J) \quad (11)$$

It can be understood that the differential observation signal of a pulse sequence including MEGA in the case of 2 spins is proportional to Expression (12) below.

$$\cos \pi J_1(t_{TE} + t_{RO}) - \cos \pi J_1(t_{TE} + t_{RO} - 2t_J) = \quad (12)$$
$$-2 \sin \pi J_1(t_{TE} + t_{RO} - t_J) \sin \pi J_1 t_J$$

Next, assume the case of three spins, namely K=2, and that a MEGA pulse acts on one or two spins.

The observed signals $Tr\{Q(t_{RO})I_x\}$ and $Tr\{Q(t_{RO})I_y\}$ in the case where $k_{MEGA}=0$ (corresponding to "MEGA OFF") are proportional to the right terms of Expressions (13) and (14), respectively.

$$Tr\{Q(t_{RO})I_x\} \propto -\sin \omega t_{RO} \cos \pi J_1(t_{TE} + t_{RO}) \cos \pi J_2(t_{TE} + t_{RO}) \quad (13)$$

$$Tr\{Q(t_{RO})I_y\} \propto \cos \omega t_{RO} \cos \pi J_1(t_{TE} + t_{RO}) \cos \pi J_2(t_{TE} + t_{RO}) \quad (14)$$

The observed signals $Tr\{Q(t_{RO})I_x\}$ and $Tr\{Q(t_{RO})I_y\}$ in the case where $k_{MEGA}=1$ (corresponding to "MEGA ON" and the case where a MEGA pulse acts on one spin) are proportional to the right terms of Expressions (15) and (16), respectively.

$$Tr\{Q(t_{RO})I_x\} \propto -\sin \omega t_{RO} \cos \pi J_1(t_{TE} + t_{RO}) \cos \pi J_2(t_{TE} + t_{RO} - 2t_J) \quad (15)$$

$$Tr\{Q(t_{RO})I_y\} \propto \cos \omega t_{RO} \cos \pi J_1(t_{TE} + t_{RO}) \cos \pi J_2(t_{TE} + t_{RO} - 2t_J) \quad (16)$$

The observed signals $Tr\{Q(t_{RO})I_x\}$ and $Tr\{Q(t_{RO})I_y\}$ in the case where $k_{MEGA}=2$ (corresponding to "MEGA ON" and the case where a MEGA pulse acts on two spins) are proportional to the right terms of Expressions (17) and (18), respectively.

$$Tr\{Q(t_{RO})I_x\} \propto \quad (17)$$
$$-\sin \omega t_{RO} \cos \pi J_1(t_{TE} + t_{RO} - 2t_J) \cos \pi J_2(t_{TE} + t_{RO} - 2t_J)$$

$$Tr\{Q(t_{RO})I_y\} \propto \quad (18)$$
$$\cos \omega t_{RO} \cos \pi J_1(t_{TE} + t_{RO} - 2t_J) \cos \pi J_2(t_{TE} + t_{RO} - 2t_J)$$

It can be understood that in the case of 3 spins and where a MEGA pulse acts on one spin, the differential observation signal of a pulse sequence including MEGA is proportional to a product of Expressions (19) and (20) below.

$$\cos \pi J_1(t_{TE} + t_{RO}) \quad (19)$$

$$\cos \pi J_2(t_{TE} + t_{RO}) - \cos \pi J_2(t_{TE} + t_{RO} - 2t_J) = \quad (20)$$
$$-2 \sin \pi J_2(t_{TE} + t_{RO} - t_J) \sin \pi J_2 t_J$$

It can be understood that in the case of 3 spins and where a MEGA pulse acts on two spins, the differential observation signal of a pulse sequence including MEGA is proportional to Expression (21) below.

$$\cos \pi J_1(t_{TE} + t_{RO}) \cos \pi J_2(t_{TE} + t_{RO}) - \quad (21)$$
$$\cos \pi J_1(t_{TE} + t_{RO} - 2t_J) \cos \pi J_2(t_{TE} + t_{RO} - 2t_J)$$

Expression (21) can be transformed into Expression (24) using the fact that each term thereof is Expression (22) and Expression (23).

$$\cos \pi J_1(t_{TE} + t_{RO}) \cos \pi J_2(t_{TE} + t_{R0}) = \quad (22)$$
$$\left(\frac{1}{2}\right) \{\cos \pi(J_1 + J_2)(t_{TE} + t_{RO}) + \cos \pi(J_1 - J_2)(t_{TE} + t_{RO})\}$$

$$\cos \pi J_1(t_{TE} + t_{RO} - 2t_J) \cos \pi J_2(t_{TE} + t_{RO} - 2t_J) = \quad (23)$$
$$\left(\frac{1}{2}\right) \{\cos \pi(J_1 + J_2)(t_{TE} + t_{RO} - 2t_J) + \cos \pi(J_1 - J_2)(t_{TE} + t_{RO} - 2t_J)\}$$

$$\cos \pi J_1(t_{TE} + t_{RO}) \cos \pi J_2(t_{TE} + t_{RO}) - \quad (24)$$
$$\cos \pi J_1(t_{TE} + t_{RO} - 2t_J) \cos \pi J_2(t_{TE} + t_{RO} - 2t_J) =$$
$$-\sin \pi(J_1 + J_2)(t_{TE} + t_{RO} - t_J) \sin \pi(J_1 + J_2)t_J -$$
$$\sin \pi(J_1 - J_2) - (t_{TE} + t_{RO} - t_J) \sin \pi(J_1 - J_2)t_J$$

Herein, $(J_1, J_2)$ is, for example, $(J_1, J_2)=(7.1, 7.0)$ or $(J_1, J_2)=(7.6, 4.1)$ or $(J_1, J_2)=(10.6, 5.4)$ (the unit is Hz), depending on the molecules. In these cases, the angular frequency $\pi(J_1+J_2)$ of the first term is 14.1, 11.7, 16.0 if $\pi$ is excluded, and the angular frequency $\pi(J_1-J_2)$ of the second term is 0.1, 3.5, 5.2 if $\pi$ is excluded. From these differences, if $t_{TE}$ and $t_J$ are not so large, the influence of the first term is dominant.

To roughly summarize these results, it can be understood that a differential observation signal has properties as set out below (hereinafter, these properties will be called a "properties of a MEGA sequence").

(1) If a spin on which a MEGA pulse acts is involved in a coupling (for the sake of explanation, this J value is expressed as "$J_1$"), the influence of the coupling manifests as cos, and a difference signal is used as a contrast, and therefore the contrast is influenced by the term shown in Expression (25) below.

$$\sin \pi J_1(t_{TE} + t_{RO} - t_J) \sin \pi J_1 t_J \quad (25)$$

(2) If two spins on which a MEGA pulse acts are involved in a coupling (for the sake of explanation, J values of the coupling are expressed as "$J_1$" and "$J_2$"), the influence of the coupling manifests as two products of cos, and a difference signal is used as a contrast, and therefore the contrast is influenced by the two terms shown in Expression (26) below. In cases where $t_{TE}$ and $t_J$ are not so large, the contrast is more susceptible to the first term.

$$-\sin \pi(J_1 + J_2)(t_{TE} + t_{RO} - t_J) \sin \pi(J_1 + J_2) t_J - \qquad (26)$$
$$\sin \pi(J_1 - J_2)(t_{TE} + t_{RO} - t_J) \sin \pi(J_1 - J_2) t_J$$

(3) If a spin on which a MEGA pulse does not act is involved in a coupling (for the sake of explanation, this J value is expressed as "$J_1$"), the contrast is influenced by the term shown in Expression (27) below. The influence in this case (3) is the same as in the case of a normal MRS pulse sequence in which NO MEGA pulse is used.

$$\cos \pi J_1 (t_{TE} + t_{RO}) \qquad (27)$$

In conventional MEGA, $t_{TE}=2t_J$ is always used in principle, and $t_{TE}$ is adjusted with respect to $J_1$ or $J_1+J_2$ using numerical value simulation (if timing adjustment is difficult, getting close to $t_{TE}=2t_J$ is the goal). However, according to the property of a MEGA sequence, which is derived as a theoretical expression under theoretical conditions not using numerical value simulation, it can be understood that the condition $t_{TE}=2t_J$ is not essential to begin with.

Thus, as another aspect of the present embodiment, a method of adjusting $t_E$ through adjusting $t_J$ not by $t_{TE}$ but by a J-coupling constant dependent method and varying influences of other metabolites needed to be distinguished from a target metabolite (although the varying process is dependent on a molecular structure of other metabolites but "varying" in most cases is "reducing") is now described. Since a contrast is adjusted according to $t_{RO}=0$ in most cases of an MRS sequence, this case is described in the example described hereinafter. If the adjustment target is not $t_{RO}=0$, $t_{TE}$ may be corrected as appropriate.

In the case of the property (1) of a MEGA sequence, $\sin \pi J_1 (t_{TE}-t_J)$ can maximize an absolute value thereof where n is an integer and $\pi J_1 (t_{TE}-t_J)=(2n+1)\pi/2$. Furthermore, $\sin \pi J_1 t_J$ can maximize an absolute value thereof where n (which is independent from the above n) is an integer and $\pi J_1 t_J=2n+1)\pi/$. For example, consider the case where $J_1=8.1$ Hz. In the same adjustment method as conventional MEGA, an adjustment of $t_{TE}-t_J$ and $t_J$ by setting them to 61.7 milliseconds is the sole option. However, since the condition $t_{TE}=2t_J$ is unnecessary to begin with, an adjustment of setting $t_{TE}-t_J$ to approximately 185.2 milliseconds and setting $t_J$ to approximately 61.7 milliseconds, or an adjustment of setting $t_{TE}-t_J$ to approximately 61.7 milliseconds and setting $t_J$ to approximately 185.2 milliseconds may be adopted, and it becomes possible to perform data acquisition wherein TE is twice as large as its original value. At this time, an option for selection with which a higher contrast can be obtained becomes possible if a T2 value and a J-coupling constant of a spin on which a MEGA pulse does not act as described in the property (3) of a MEGA sequence are considered.

As for the first term, although the case of the property (2) of a MEGA sequence is more complicated than in the case of (1), an absolute value of the term can be maximized by satisfying the conditions $\pi(J_1+J_2)(t_{TE}-t_J)=(2n+1)\pi/2$ wherein n is an integer, $\pi(J_1+J_2)t_J=(2n+1)\pi/2$ wherein n is an integer (independent from the above n). As for the second term, an absolute value of the term can be maximized by satisfying the conditions $\pi(J_1-J_2)(t_{TE}-t_J)=(2n+1)\pi/2$ wherein n is an integer (independent from the above n), $\pi(J_1-J_2)t_J=(2n+1)\pi/2$ wherein n is an integer (independent from the above n). Since the second term becomes smaller within the range of a target TE (e.g., less than 200 milliseconds) depending on the value of ($J_1$, $J_2$), it suffices that a selection in which $J_1$ is replaced with ($J_1+J_2$) in the case of property (1) of a MEGA sequence is made. Alternatively, a timing at which an excellent contrast can be obtained regardless of a value of ($J_1$, $J_2$) can be calculated if the expression representing the property (2) of a MEGA sequence is calculated with $t_{TE}-t_J$ and $t_J$ changed at a suitable interval (e.g., an interval of 0.1 milliseconds). Also in this case, an option for selection with which a higher contrast can be obtained becomes possible if a T2 value and a J-coupling constant of a spin on which a MEGA pulse does not act as described in the property (3) of a MEGA sequence are considered.

An addition of a prepulse-additional type MEGA sequence, which was described as an example of the present embodiment, means that a density operator $S_{k,z}$ (wherein $k<k_{MEGA}$) in a balanced state is suppressed prior to an excitation pulse. Thus, it can be understood that the addition does not affect a contrast of a signal obtained from a focused-on density operator Iz and acts in such a manner that a non-focused-on density operator or a signal from another metabolite is selectively suppressed, and improves a contrast of a signal obtained from the focused-on density operator Iz.

According to some of the foregoing embodiments, there is a first mode in which selection frequencies of the frequency selective pulses before and after an excitation pulse are differentiated and a second mode in which frequency selective pulses are optimized so that ($t_{TE}-t_J$) differs from $t_J$. The processing circuitry 51 can select, through the imaging condition setting function 514, a first mode and a second mode as appropriate. As the selection method, a user's selecting method or an automatic selecting method based on other imaging conditions may be adopted. In a user's selecting method, the processing circuitry 51 causes, through the display control function 516, the display 53 to display a window for selecting a first mode and a second mode (hereinafter, a "selection window").

Figure 12:
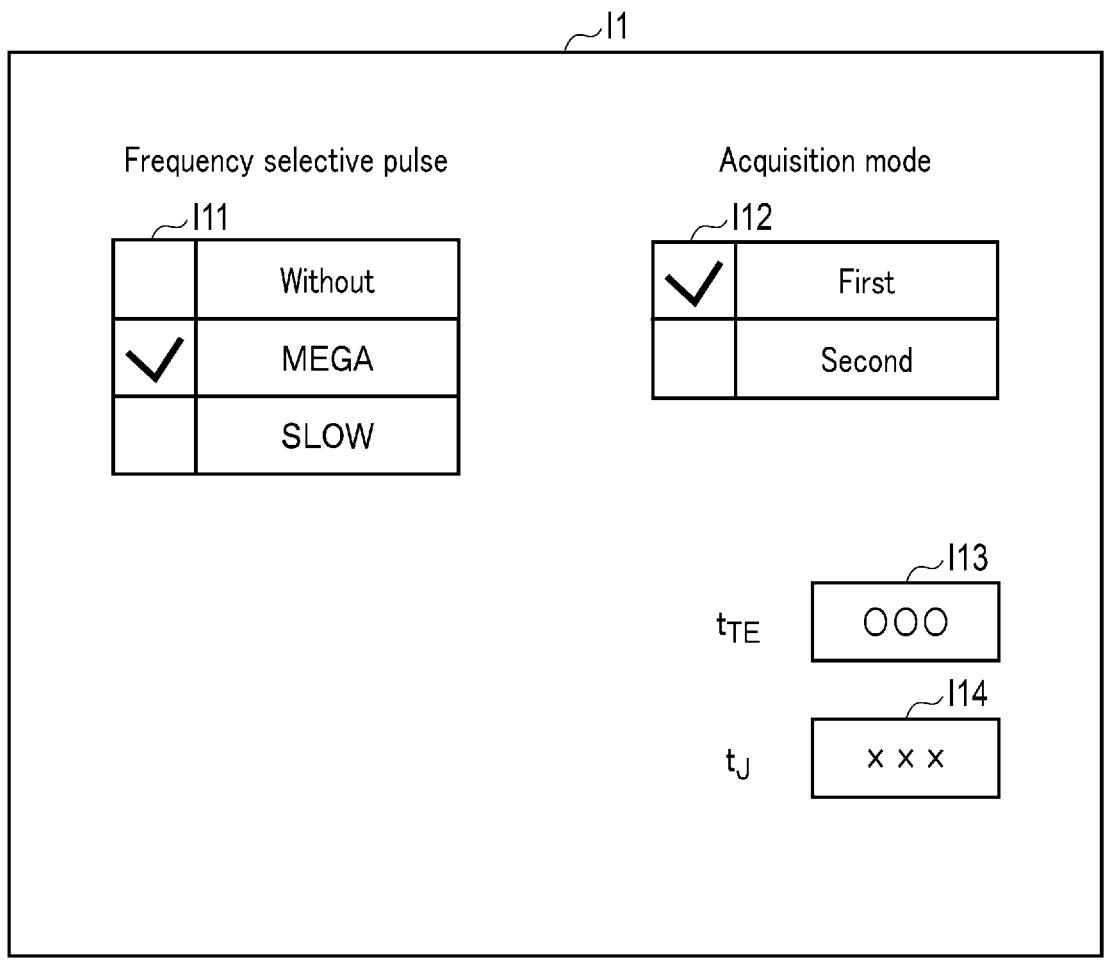
FIG. 12 is a diagram showing an example of a selection window.

FIG. 12 is a diagram showing an example of the selection window I1. As shown in FIG. 12, the selection window I1 includes a selection window I11, a selection window I12, an input window I13, and an input window I14. The selection window I11 is a graphical user interface (GUI) component for selecting types of a first frequency selective pulse. As a candidate that may be selected by a first frequency selective pulse, there are "MEGA", which means a MEGA pulse, and "SLOW", which means a SLOW pulse, for example. FIG. 12 shows an example where a MEGA pulse is selected. Other frequency selective pulses, such as a BASING pulse, etc., may be listed as a candidate for selection. As a selection format in the selection window I11, a checkbox as shown in FIG. 12 or other formats such as a pull-down menu or a free-text format may also be possible. If a first frequency selective pulse is not used, "not used" can be selected.

The selection window I12 is a GUI component for selecting a first mode or a second mode. As a selection format in the selection window I12, a checkbox as shown in FIG. 12 may be possible. "First" means a first mode and "second" means a second mode. A selection format for the selection window I12 is not limited to a checkbox, and it may be other formats, such as a pull-down menu or a free-text format.

The input window I13 is a GUI component for inputting an echo time $t_{TE}$. The input window I14 is a GUI component for inputting an elapsed time $t_J$ between a time of applying a frequency selective pulse and a time of applying another frequency selective pulse subsequent to the frequency selective pulse. The input format for the input window I13 and the input window I14 may be a free-text format as shown in FIG. 12, or a checkbox or a pull-down menu. The input echo time $t_{TE}$ "XXX" and the elapsed time $t_J$ "YYY" are displayed in the input window I13 and the input window I14, respectively.

According to at least one of the foregoing embodiments, a contrast of a focused-on signal in the MRS (MR spectroscopy) can be improved.

The term "processor" used in the above explanation indicates, for example, a circuit, such as a CPU, a GPU, or an application specific integrated circuit (ASIC), and a programmable logic device (for example, a simple programmable logic device (SPLD), a complex programmable logic device (CPLD), and a field programmable gate array (FPGA)). The processor realizes its function by reading and executing the program stored in the storage circuitry. The program may be directly incorporated into the circuit of the processor instead of being stored in the storage circuitry. In this case, the processor implements the function by reading and executing the program incorporated into the circuit. If the processor is for example an ASIC, on the other hand, the function is directly implemented in a circuit of the processor as a logic circuit, instead of storing a program in a storage circuit. Each processor of the present embodiment is not limited to a case where each processor is configured as a single circuit; a plurality of independent circuits may be combined into one processor to realize the function of the processor. In addition, a plurality of structural elements in FIG. 1 may be integrated into one processor to realize the function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Regarding the foregoing embodiments, the appendage of the following is disclosed as one aspect and selective features of the invention.

Additional Note 1

A magnetic resonance imaging apparatus that includes a sequence control circuitry that repeatedly performs a first data acquisition for acquiring first data relating to a measurement target, using a first MRS pulse sequence including a first frequency selection means based on a first frequency selection pattern that includes a plurality of frequency selective pulses, and a second data acquisition for acquiring second data relating to the measurement target, using a second MRS pulse sequence including a second frequency selection means for selecting a second frequency selection pattern that differs from the first frequency selection pattern and includes a plurality of frequency selective pulses.

The plurality of frequency selective pulses make selection frequencies of frequency selective pulses before and after an excitation pulse differ and/or are optimized so as to make $(t_{TE}-t_J)$ differ from $t_J$ wherein $t_J$ is a time between the plurality of frequency selective pulses and $t_{TE}$ is an echo time.

Additional Note 2

The first frequency selection means may include first frequency selective pulse of a first resonance for a specific frequency and a second frequency selective pulse of a second resonance for the specific frequency. The second frequency selection means may include the first frequency selective pulse of a second resonance for the specific frequency and the second frequency selective pulse of a first resonance for the specific frequency.

Additional Note 3

The first frequency selective pulse may be a frequency selective pulse subsequent to an inverse pulse of a basic sequence of MR spectroscopy. The second frequency selective pulse is a prepulse that precedes a basic sequence of MR spectroscopy.

Additional Note 4

The basic sequence may be PRESS, STEAM, LASER, semi-LASER, SPECIAL, or ISIS. The first frequency selective pulse may be a MEGA pulse, a SLOW pulse, or a BASING pulse.

Additional Note 5

Flip angles of the first frequency selective pulse and the second frequency selective pulse may be different.

Additional Note 6

The sequence control circuitry may maintain an echo time, a repetition time, and a gradient field pulse under the same conditions for the first MRS pulse sequence and the second MRS pulse sequence that are repeatedly performed.

Additional Note 7

The apparatus may further comprise processing circuitry configured to generate visualized information in which information of a frequency other than the specific frequency is visualized based on the first data and the second data.

Additional Note 8

The processing circuitry may generate the visualized information based on difference data of the first data and the second data.

Additional Note 9

The processing circuitry may generate an MRS spectrum and/or a CSI image as the visualized information.

Additional Note 10

The processing circuitry may estimate, as the visualized information, a classification name of a metabolite included in the measurement target or a classification name of a disease exhibited by the measurement target based on the first data and the second data.

Additional Note 11

The processing circuitry may estimate, as the visualized information, an absolute value and/or a relative value of an amount of substance of a metabolite included in the measurement target based on the first data and the second data.

Additional Note 12

The processing circuitry causes a display device to display the visualized information.

Additional Note 13

The apparatus may further comprise processing circuitry configured to cause a display device to display a window for selecting a first mode that makes selection frequencies of frequency selective pulses before and after an excitation pulse differ and a second mode in which frequency selective pulses are optimized so as to make $(t_{TE}-t_J)$ differ from $t_J$ wherein $t_J$ is a time between frequency selective pulses and time $t_{TE}$ is an echo time.

Additional Note 14

The window may include an input window for the time $t_J$ and an input window for the echo time $t_{TE}$, in addition to a GUI component for selecting the first mode or the second mode.

Additional Note 15

The window may include a GUI component for selecting a type of the first frequency selective pulse.

What is claimed is:

1. A magnetic resonance imaging apparatus comprising:
sequence control circuitry that repeatedly performs a first data acquisition for acquiring first data relating to a measurement target, using a first MRS pulse sequence including a first frequency selection means based on a first frequency selection pattern that includes a plurality of frequency selective pulses, and a second data acquisition for acquiring second data relating to the measurement target, using a second MRS pulse sequence including a second frequency selection means for selecting a second frequency selection pattern that differs from the first frequency selection pattern and includes a plurality of frequency selective pulses, wherein
the plurality of frequency selective pulses make selection frequencies of frequency selective pulses before and after an excitation pulse differ and/or are optimized so as to make $(t_{TE}-t_J)$ differ from $t_J$ wherein $t_J$ is a time between the plurality of frequency selective pulses and $t_{TE}$ is an echo time.

2. The magnetic resonance imaging apparatus according to claim 1, wherein
the first frequency selection means includes a first frequency selective pulse of a first resonance for a specific frequency and a second frequency selective pulse of a second resonance for the specific frequency, and
the second frequency selection means includes the first frequency selective pulse of the second resonance for the specific frequency and the second frequency selective pulse of the first resonance for the specific frequency.

3. The magnetic resonance imaging apparatus according to claim 2, wherein
the first frequency selective pulse is a frequency selective pulse subsequent to an inverse pulse of a basic sequence of MR spectroscopy, and
the second frequency selective pulse is a prepulse that precedes a basic sequence of MR spectroscopy.

4. The magnetic resonance imaging apparatus according to claim 3, wherein
the basic sequence is PRESS, STEAM, LASER, semi-LASER, SPECIAL, or ISIS, and
the first frequency selective pulse is a MEGA pulse, a SLOW pulse, or a BASING pulse.

5. The magnetic resonance imaging apparatus according to claim 2, wherein
the first frequency selective pulse and the second frequency selective pulse have different flip angles.

6. The magnetic resonance imaging apparatus according to claim 1, wherein
the sequence control circuitry maintains an echo time, a repetition time, and a gradient field pulse at identical conditions for the first MRS pulse sequence and the second MRS pulse sequence that are repeatedly performed.

7. The magnetic resonance imaging apparatus according to claim 2, further comprising processing circuitry configured to generate visualized information in which information of a frequency other than the specific frequency is visualized based on the first data and the second data.

8. The magnetic resonance imaging apparatus according to claim 7, wherein
the processing circuitry generates the visualized information based on difference data of the first data and the second data.

9. The magnetic resonance imaging apparatus according to claim 7, wherein
the processing circuitry generates an MRS spectrum and/or a CSI image as the visualized information.

10. The magnetic resonance imaging apparatus according to claim 7, wherein
the processing circuitry estimates, as the visualized information, a classification name of a metabolite included in the measurement target or a classification name of a disease exhibited by the measurement target based on the first data and the second data.

11. The magnetic resonance imaging apparatus according to claim 7, wherein
the processing circuitry estimates, as the visualized information, an absolute value and/or a relative value of an amount of substance of a metabolite included in the measurement target based on the first data and the second data.

12. The magnetic resonance imaging apparatus according to claim 7, wherein
the processing circuitry causes a display device to display the visualized information.

13. The magnetic resonance imaging apparatus according to claim 1, further comprising processing circuitry that causes a display device to display a window for selecting a first mode of making selection frequencies of frequency selective pulses before and after an excitation pulse differ and a second mode in which the frequency selective pulses are optimized so as to make $(t_{TE}-t_J)$ differ from $t_J$ wherein $t_J$ is a time between the plurality of frequency selective pulses and $t_{TE}$ is an echo time.

14. The magnetic resonance imaging apparatus according to claim 13, wherein
the window includes a GUI component for selecting either the first mode or the second mode, and an input window for the time $t_J$ and an input window for the echo time $t_{TE}$.

15. The magnetic resonance imaging apparatus according to claim 13, wherein
the window includes a GUI component for selecting a type of the first frequency selective pulse.

* * * * *